United States Patent
Park et al.

(10) Patent No.: US 11,019,507 B2
(45) Date of Patent: May 25, 2021

(54) METHOD AND APPARATUS FOR CHANGING OPERATING MODE IN WIRELESS LAN SYSTEM

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/091,514

(22) PCT Filed: Mar. 3, 2017

(86) PCT No.: PCT/KR2017/002303
§ 371 (c)(1),
(2) Date: Oct. 4, 2018

(87) PCT Pub. No.: WO2017/183807
PCT Pub. Date: Oct. 26, 2017

(65) Prior Publication Data
US 2019/0124526 A1    Apr. 25, 2019

Related U.S. Application Data

(60) Provisional application No. 62/330,268, filed on May 2, 2016, provisional application No. 62/323,815, filed on Apr. 18, 2016.

(51) Int. Cl.
*H04W 24/02* (2009.01)
*H04L 1/16* (2006.01)
(Continued)

(52) U.S. Cl.
CPC .......... *H04W 24/02* (2013.01); *H04L 1/1614* (2013.01); *H04L 1/1685* (2013.01); *H04W 24/08* (2013.01); *H04W 84/12* (2013.01)

(58) Field of Classification Search
CPC ..... H04W 24/02; H04W 28/18; H04W 28/20; H04W 72/04–042; H04W 84/12; H04L 1/1685
See application file for complete search history.

(56) References Cited

U.S. PATENT DOCUMENTS 10,182,399 B1 *  1/2019  Chu ................. H04W 52/0229
2013/0070701 A1  5/2013  Merlin et al.
(Continued)

FOREIGN PATENT DOCUMENTS

WO       2012170864       12/2012

OTHER PUBLICATIONS

PCT International Application No. PCT/KR2017/002303, International Search Report dated Jun. 9, 2017, 4 pages.

*Primary Examiner* — Pao Sinkantarakorn
(74) *Attorney, Agent, or Firm* — Lee, Hong, Degerman, Kang & Waimey PC

(57) ABSTRACT

Disclosed is a signal processing method for changing an operating mode for transmitting a PPDU in a wireless LAN system. Specifically, a first station transmits, to a second station, the number of spatial streams supported by the first station, and a first instructional information instructing a change of the operating mode indicating a channel bandwidth. The first station applies the first instructional information after receiving an ACK therefor. The first instructional information comprises an operating mode indicator for indicating whether the operating mode is a receive operating mode (ROM) or a transmit operating mode (TOM).

10 Claims, 33 Drawing Sheets

(51) Int. Cl.
*H04W 24/08* (2009.01)
*H04W 84/12* (2009.01)

(56) References Cited

U.S. PATENT DOCUMENTS

| | | |
|---|---|---|
| 2013/0194920 A1 | 8/2013 | Chu et al. |
| 2015/0139115 A1 | 5/2015 | Seok |
| 2015/0173014 A1* | 6/2015 | Lee .................. H04W 52/0216 |
| | | 370/311 |
| 2016/0014595 A1 | 1/2016 | Wong et al. |
| 2017/0105208 A1* | 4/2017 | Hedayat .............. H04W 72/048 |
| 2018/0302194 A1* | 10/2018 | Wang .................. H04L 1/1635 |

* cited by examiner

FIG. 1
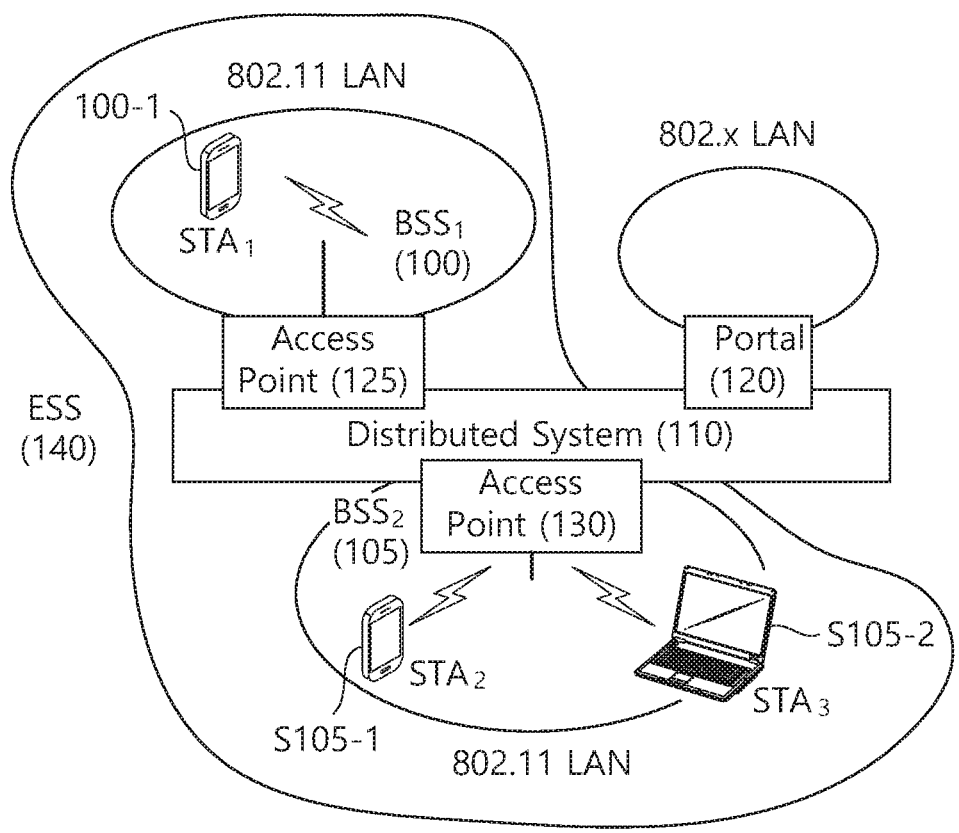
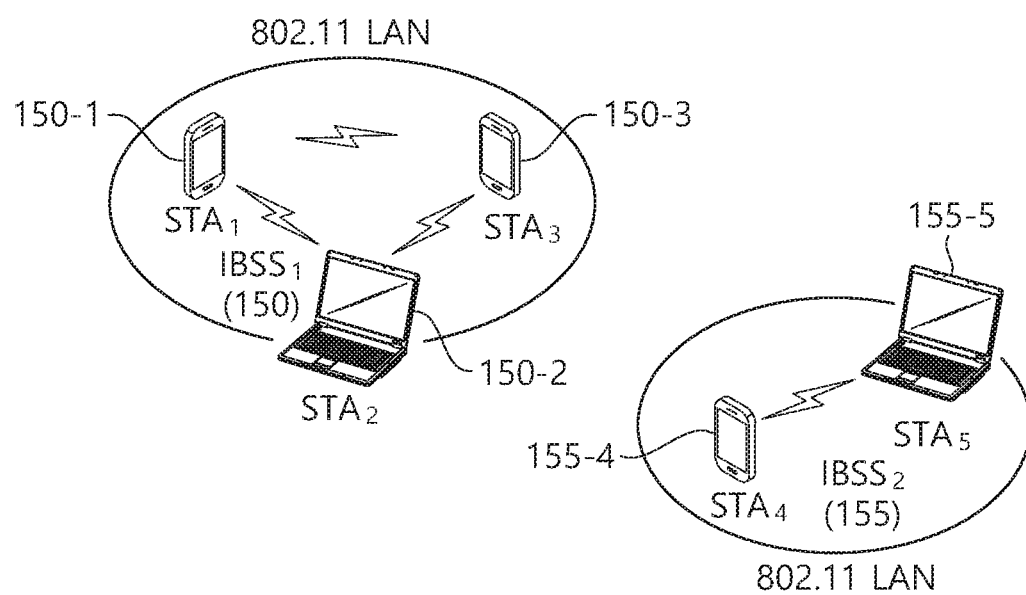

METHOD AND APPARATUS FOR CHANGING OPERATING MODE IN WIRELESS LAN SYSTEM

CROSS-REFERENCE TO RELATED APPLICATIONS

This application is the National Stage filing under 35 U.S.C. 371 of International Application No. PCT/KR2017/002303, filed on Mar. 3, 2017, which claims the benefit of U.S. Provisional Application No. 62/323,815, filed on Apr. 18, 2016, and 62/330,268, filed on May 2, 2016, the contents of which are all hereby incorporated by reference herein in their entireties.

BACKGROUND OF THE INVENTION

Field of the Invention

This specification relates to a method associated with an operating mode in a wireless local area network (LAN) system and, most particularly, to a method and apparatus for changing an operating mode during a predetermined time period (or time interval) in a wireless station of a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

This specification proposes an enhanced field structure and an enhanced signaling method associated with the operating mode.

This specification proposes an example of the operating mode being changed at a predetermined time in transmitting and receiving apparatuses according to the present invention. Additionally, this specification proposes diverse examples related to UL MU transmission that is associated with the operating mode.

This specification proposes an example related to a method of processing control information for configuring a physical layer protocol data unit (PPDU) in a wireless LAN system and an apparatus performing the corresponding method.

First, terms used herein are defined as follows. A first station (STA) may correspond to a non-access point (AP) STA, and a second STA may correspond to an AP STA that performs communication with the non-AP STA.

The first STA transmits, to the second STA, first indication information that indicates a change of an operating mode indicating the number of spatial streams and a channel bandwidth which are supported by the first STA.

Upon receiving an ACK of the first indication information, the first STA applies the first indication information.

The first indication information includes an operating mode indicator indicating whether the operating mode is a receive operating mode (ROM) or a transmit operating mode (TOM). That is, the operating mode indicator may be included in an operating mode indication (OMI) field so that the OMI field may indicate whether the number of spatial streams and the channel bandwidth are used for an ROM change or a TOM change.

Therefore, the first indication information that indicates the change of operating mode may correspond to an ROM request (or ROMI) or a TOM request (or TOMI). The first STA makes a request for an ROM change or a TOM change to the second STA. The channel bandwidth may include at least one of 2.0 MHz, 40 MHz, 80 MHz, and 160 MHz.

When the operating mode indicator indicates that the operating mode is the ROM, the first STA may receive a PPDU in the changed operating mode based on the first indication information. That is, the first STA may receive DL data in the changed ROM.

When the operating mode indicator indicates that the operating mode is the TOM, the first STA may transmit a PPDU in the changed operating mode based on the first indication information. That is, the first STA may transmit UL data in the changed TOM.

For example, it is assumed that the operating mode indicator indicates that the operating mode is the ROM. Here, when the first STA does not receive the ACK of the first indication information, the PPDU may be transmitted including an ROM request/response bit. The ROM request/response bit may indicate that the second STA transmits the PPDU in the changed operating mode based on the first indication information. The ROM request/response bit may be further included in the first indication information.

That is, when the first STA makes an ROM request but does not receive an ACK of the ROM request, only the second STA may change the operating mode, resulting in disagreement in operating mode between the first. STA and the second STA. To prevent this disagreement, the ROM request/response bit may be generated to notify the first STA in advance that the second STA is transmitting the PPM in the changed operating mode.

Further, when the first STA does not receive the ACK of the first indication information, the first STA may receive, from the second STA, second indication information that indicates a change of an operating mode indicating the number of spatial streams and a channel bandwidth which are supported by the first STA. Here, the second indication information is transmitted from the second STA and may thus correspond to a TOM request field. The number of spatial streams and the channel bandwidth indicated by the second indication information may be the same as the number of spatial streams and the channel bandwidth indicated by the first indication information. That is, the number of spatial streams and the channel bandwidth used in the ROM may be used equally in the TOM.

The first indication information and the second indication information may be transmitted through a quality of service (QoS) null frame or a data frame. When the second indication information is transmitted through a QoS null frame, the QoS null frame may include an ACK policy. Accordingly, the first STA may transmit an ACK of the second indication information based on the ACK policy.

The first indication information may be included in a data field of the PPDU transmitted to the second STA. The indication information may be included in a medium access control (MAC) header of the data field.

According to an example of this specification, the operating mode of transmission and reception apparatuses may be changed at a preset time. Further, an improved field structure and an improved signaling scheme related to the operating mode may be used.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
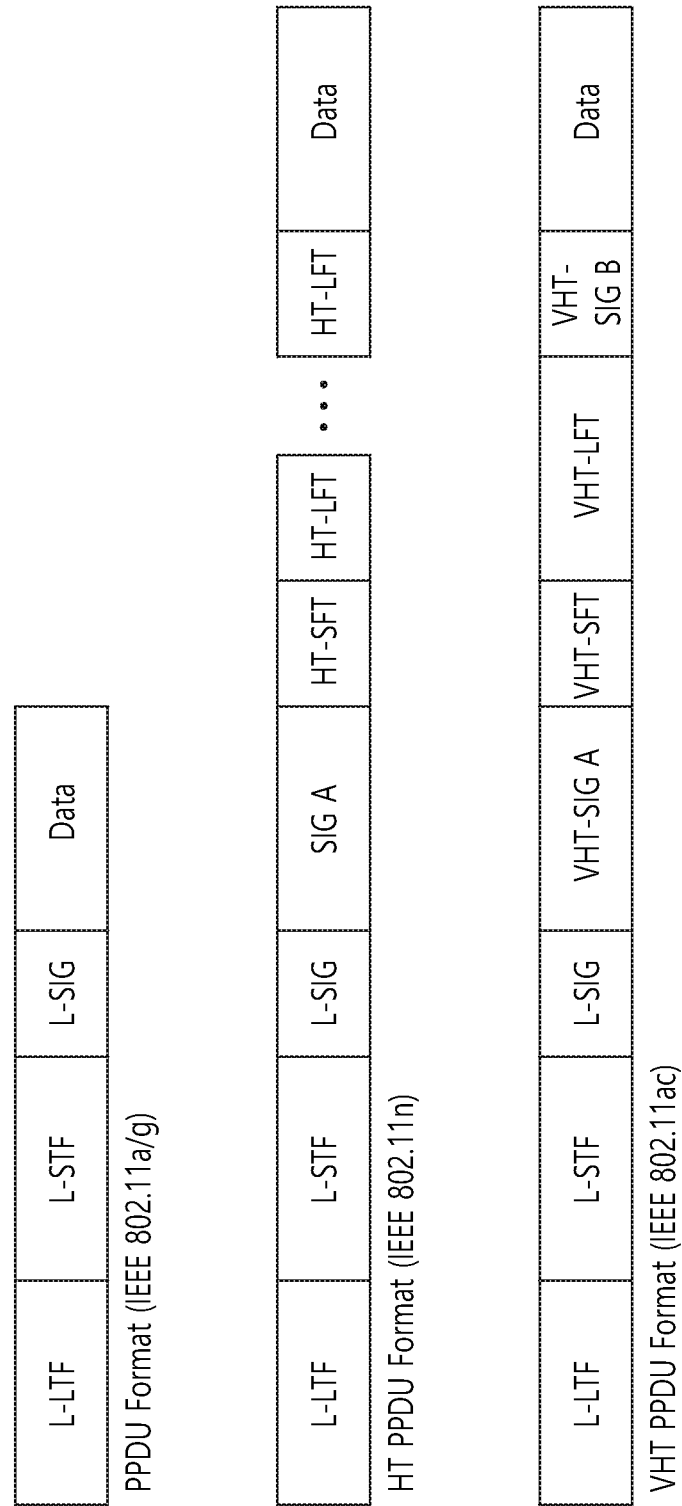
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving STA, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
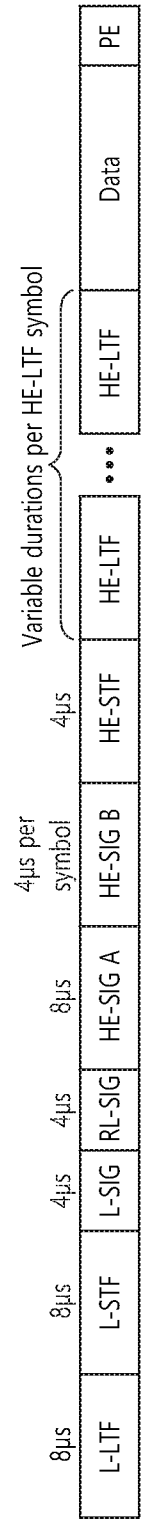
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

More detailed description of the respective fields of FIG. 3 will be made below.

Figure 4:
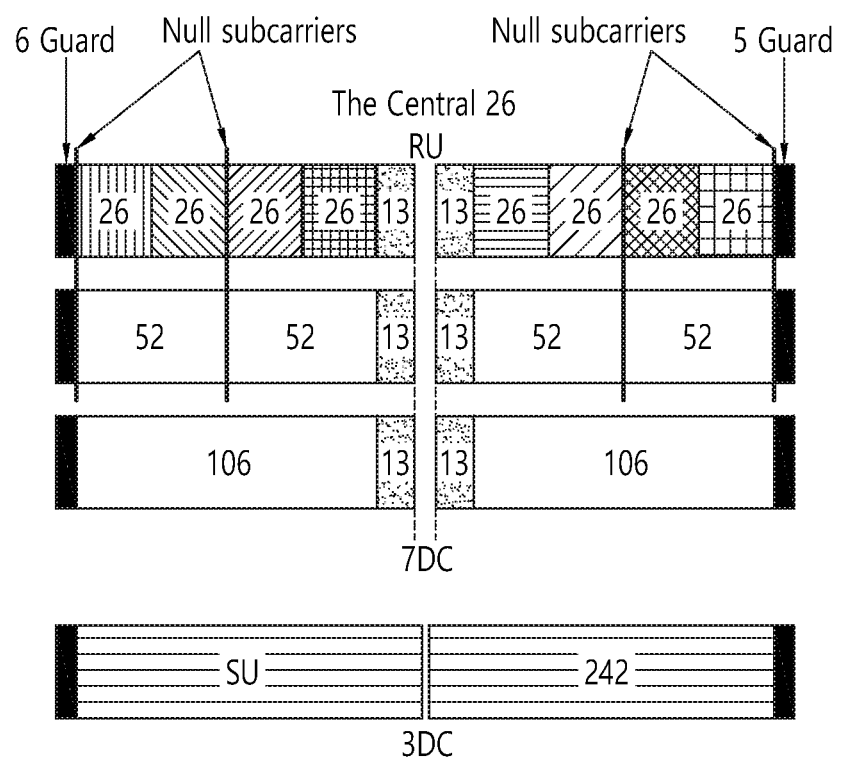
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving STA, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
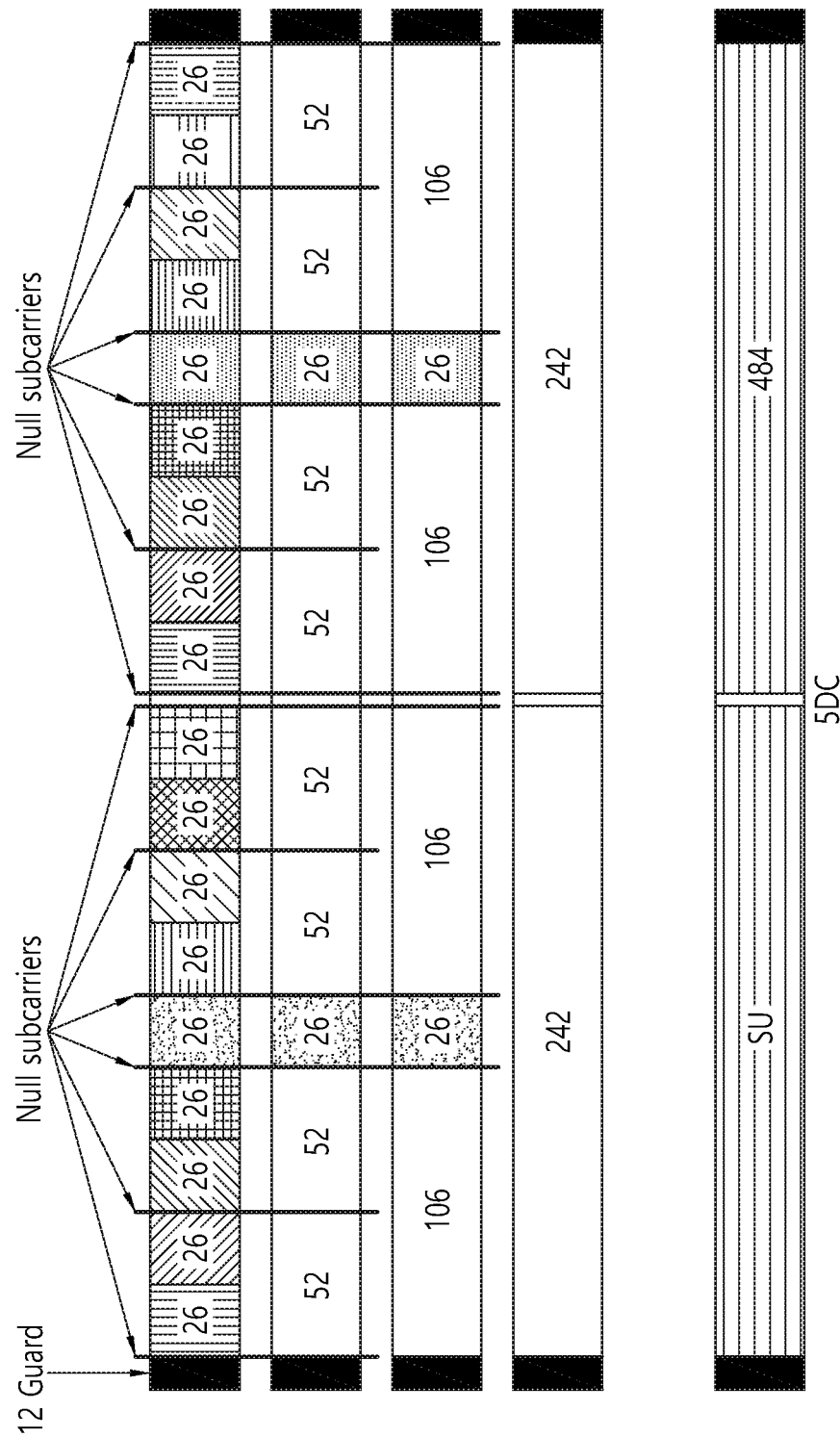
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
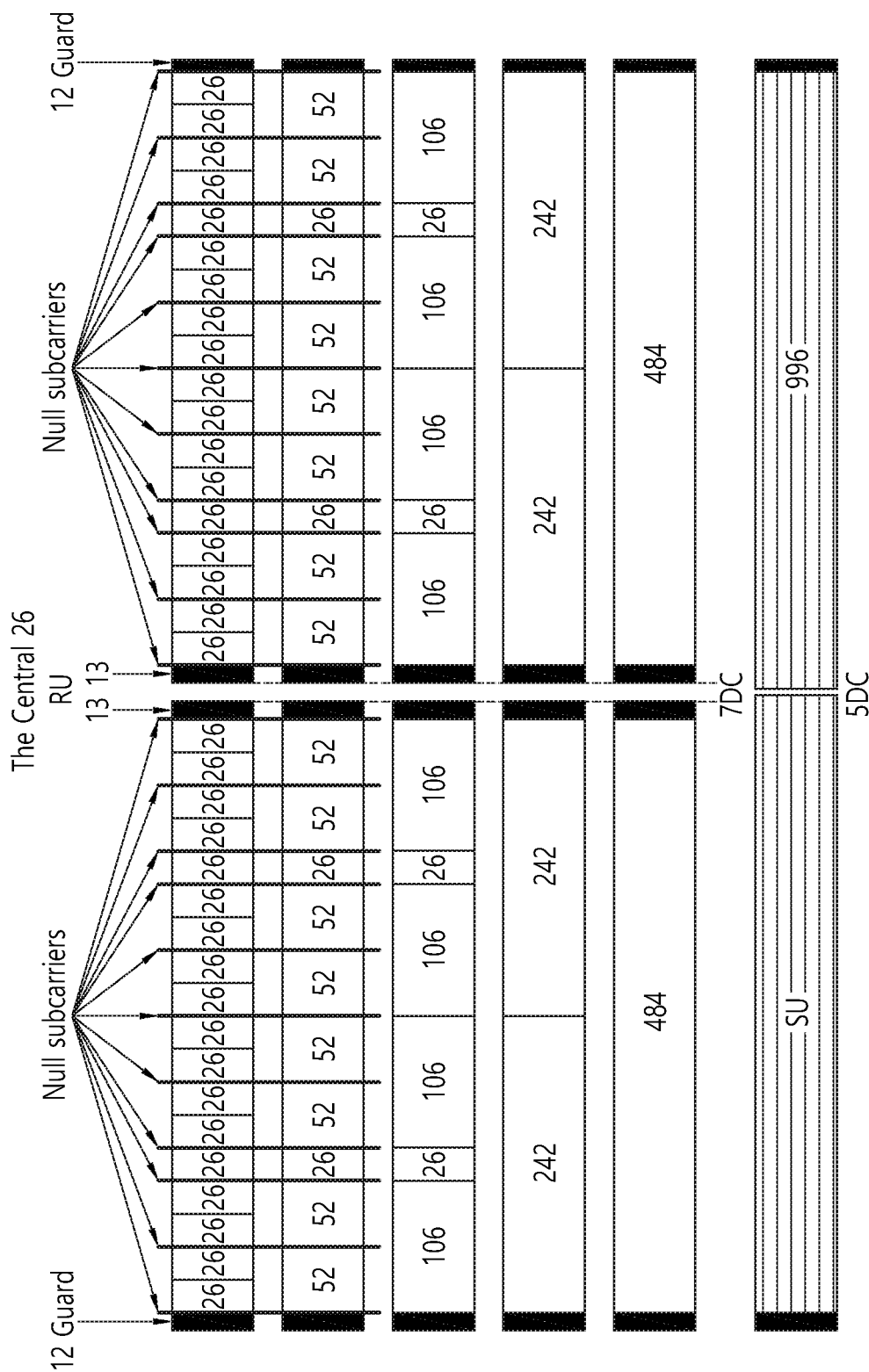
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
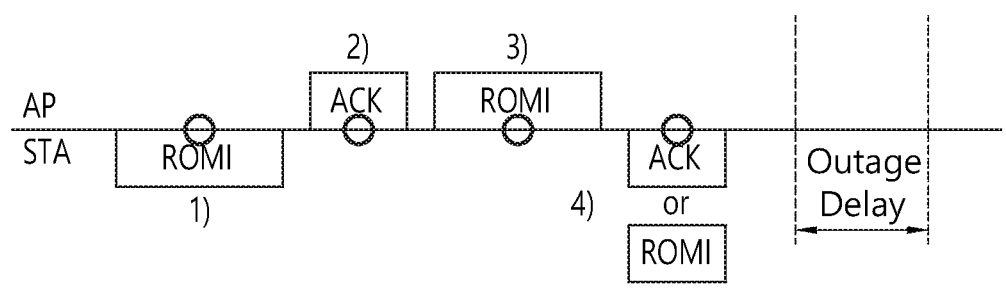
FIG. 26 illustrates an example in which an operating mode reported between an AP and an STA is applied according to ROMI or TOMI transmission.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
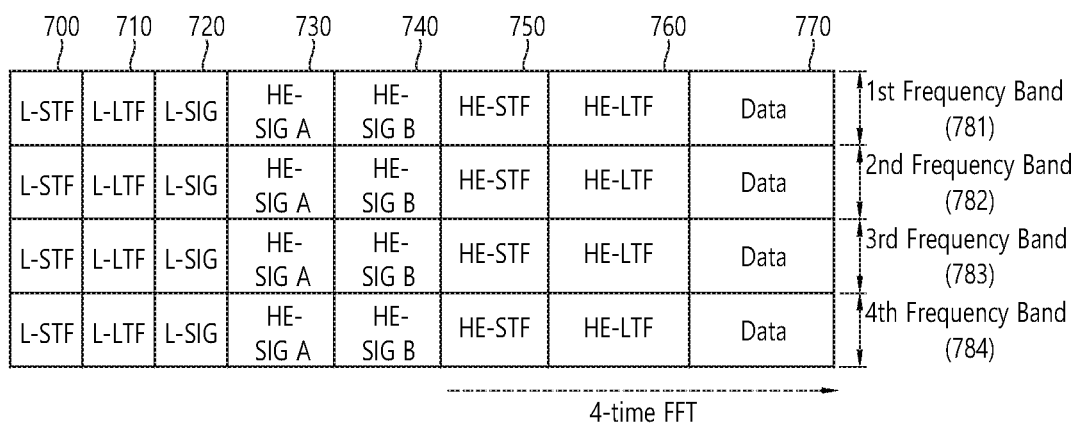
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving STA.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
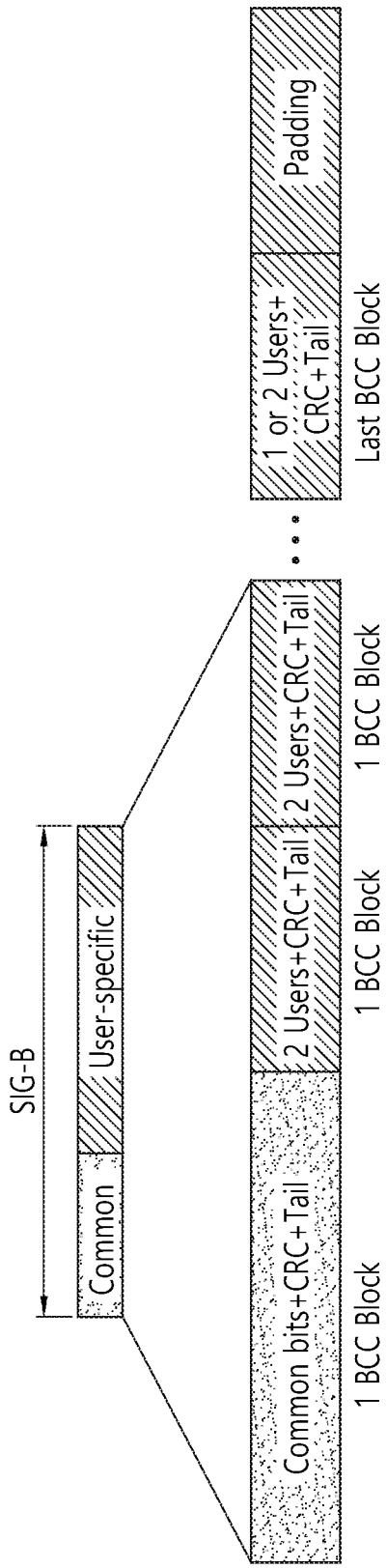
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving STA) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
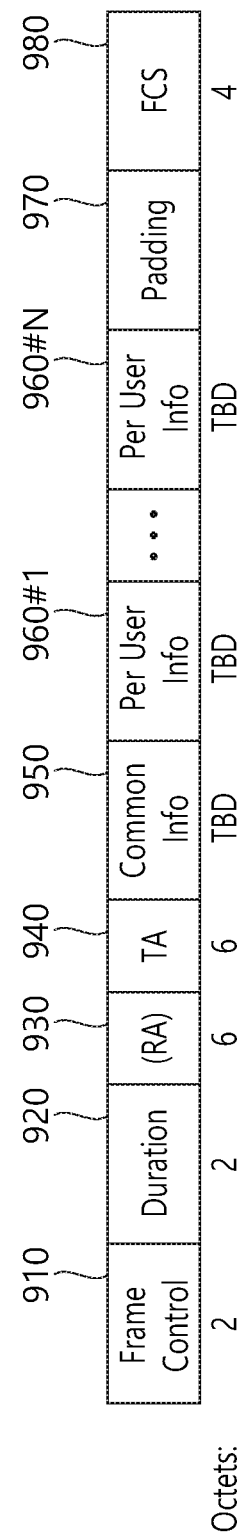
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

Figure 10:
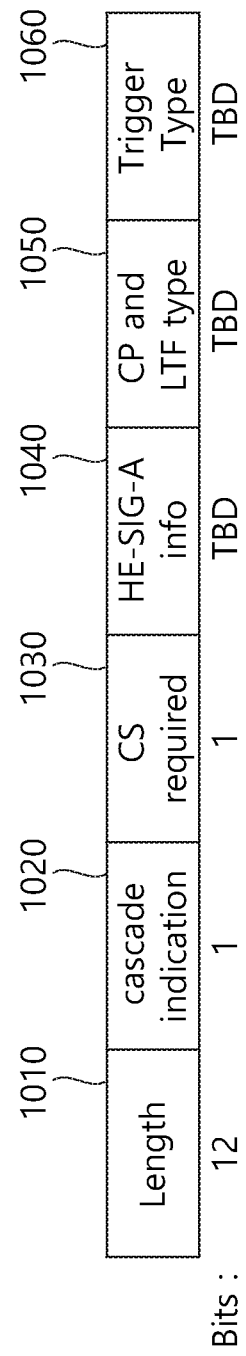
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 11:
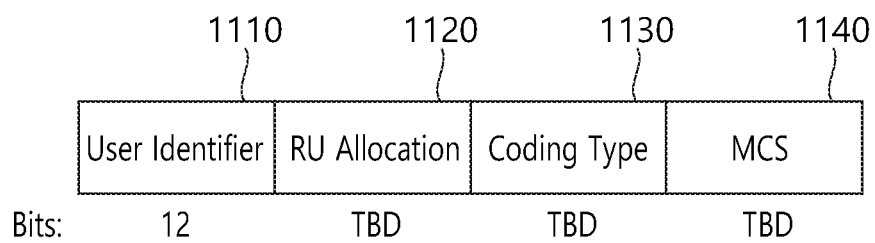
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

Hereinafter, the exemplary embodiment of the present invention relates to an operating mode that is used in an STA (e.g., AP and/or non-AP STA) of a wireless LAN system.

The operating mode may be categorized as a transmit operating mode and a receive operating mode. The receive operating mode relates to operations of a STA (e.g., non-AP STA) that has reported its operating mode receiving a signal from its opposite STA (e.g., AP). Conversely, the transmit operating mode relates to operations of the opposite STA (e.g., AP) transmitting a signal to the STA (e.g., non-AP STA) that has reported its operating mode. For example, the transmit operating mode may be used for the UL MU PPDU, which is simultaneously transmitted by multiple STAs in response to the trigger frame of FIG. 9.

Figure 12:
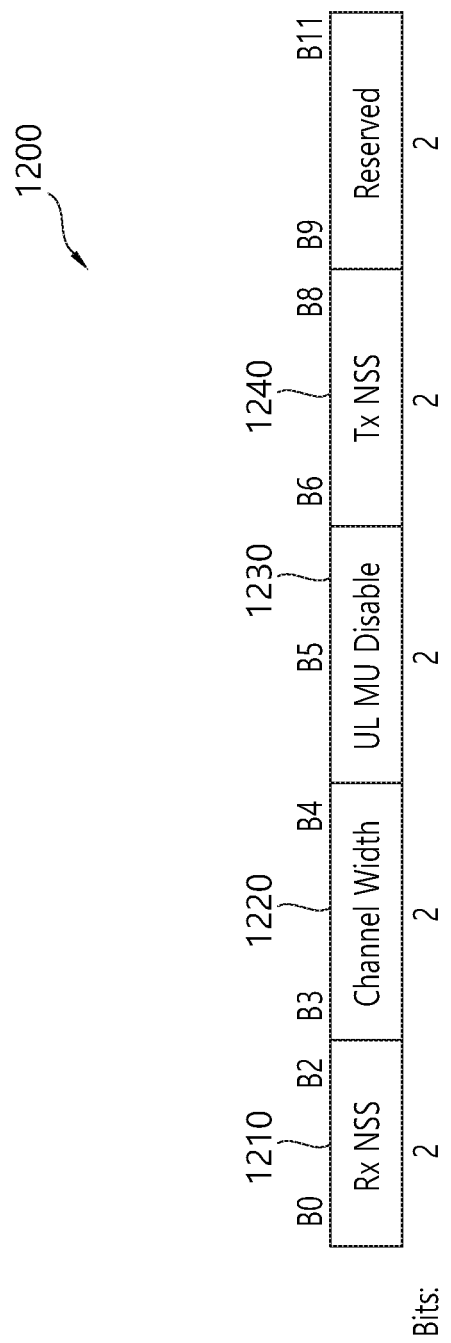
FIG. 12 illustrates an example of control information 1200 used to report an operating mode.

FIG. 12 illustrates an example of control information 1200 used to report an operating mode.

As shown in the drawing, the control information 1200 may include all or part of multiple subfields 1210, 1220, 1230, and 1240, and the control information 1200 may also additionally include subfields that are not shown in the drawing. The control information 1200 of FIG. 12 may be included in a MAC frame, which is included in a data field of the PPDU.

A Rx NSS subfield 1210 of FIG. 12 may indicate a maximum number of spatial streams that are used when the STA (e.g., non-AP STA), which reports the control information 1200, receives a signal/PPDU. For example, the Rx NSS subfield 1210 may be configured of an information field by using 3 bits.

For example, the Rx NSS subfield 1210 of FIG. 12 may indicate the number of spatial streams that are used when the STA receives a downlink PPDU. More specifically, when the AP configures a PPDU for a specific receiving STA, the AP may refer to the corresponding subfield 1210.

A Channel Width subfield 1220 of FIG. 12 may indicate an operating channel that is supported by the STA (e.g., non-AP STA), which reports the control information 1200. More specifically, this may indicate a maximum level (or size) of the operating channel supported by the STA, for example, the value of "0" may indicate 20 MHz, the value of "1" may indicate 40 MHz, the value of "2" may indicate 80 MHz, and the value of "3" may indicate 160 MHz or 80+80 MHz. The Channel Width subfield 1220 may commonly indicate a transmitting channel and a receiving channel that are used by the STA, which reports the control information 1200.

A UL MU Disable subfield 1230 of FIG. 12 may indicate whether or not the STA (e.g., non-AP STA), which reports the control information 1200, supports UL MU operations.

For example, in case an UL MU operation is suspended due to a particular reason, a specific value (e.g., "1") may be indicated, and, in case the UL MU operation is resumed, another value (e.g., "0") may be indicated.

The UL MU Disable subfield 1230 may be used in a UL MU operation that is associated with the trigger frame of FIG. 9. In order to perform an adequate UL MU communication, the AP may verify whether or not UL MU is supported by a specific non-AP STA. More specifically, when configuring a trigger frame (i.e., the trigger frame shown in FIG. 9) for the UL MU communication, the corresponding subfield 1230 may be used.

A Tx NSS subfield 1240 of FIG. 12 may indicate a maximum number of spatial streams that are used when the STA (e.g., non-AP STA), which reports the control information 1200, transmits a signal/PPDU.

Although the example shown in FIG. 12 corresponds to an example, wherein the Rx NSS 1210 and the Tx NSS 1240 are configured as separate subfields, the corresponding subfields may be modified (or changed). For example, it is possible to commonly indicate the Rx NSS (i.e., a number of spatial streams being used in a specific STA for PPDU reception) and the Tx NSS (i.e., a number of spatial streams being used in a specific STA for PPDU transmission) through a single NSS subfield.

Figure 13:
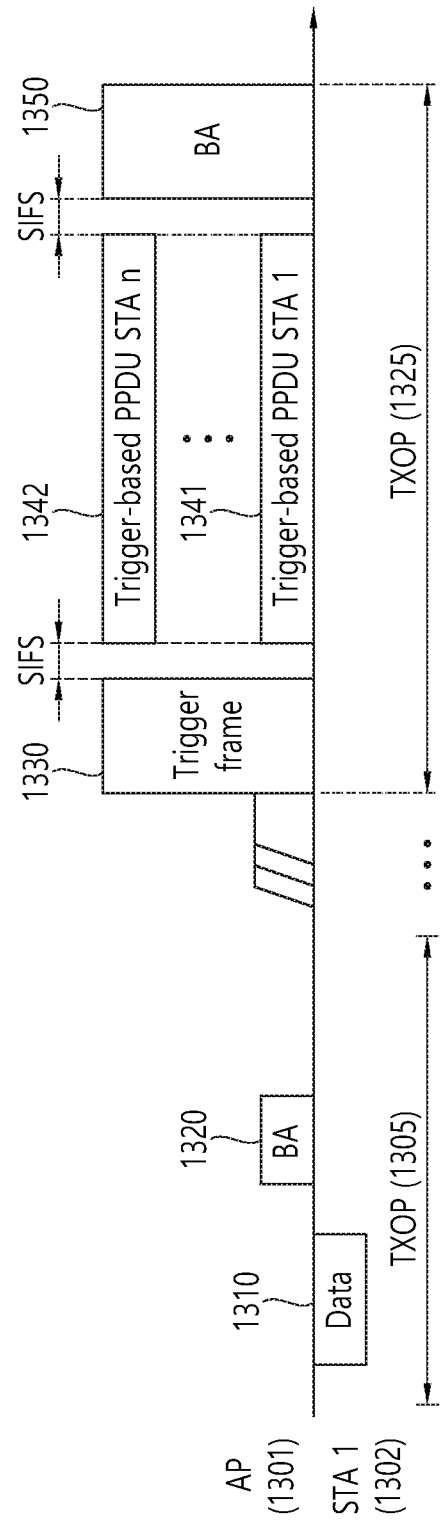
FIG. 13 illustrates an example of the reported operating mode being used for UL MU operations.

FIG. 13 illustrates an example of the reported operating mode being used for UL MU operations.

The example shown in FIG. 13 corresponds to operations between a first STA and a second STA, wherein the first STA may correspond to the AP 1301 and the second STA may correspond to the STA 1302. In the example shown in FIG. 13, STA1 1302 corresponds to a STA that reports the operating mode to the AP 1301. STA1 1302 may transmit a PPDU including a data field 1310 to the AP 1301 during a first TXOP 1305, and the corresponding data field 1310 may include the control information 1200 of FIG. 12. The AP 1301 may transmit a block ACK (BA) 1320 indicating that the corresponding data field 1310 has been successfully received to the AP 1301.

The AP 1301 may be informed of the transmit operating mode and the receive operating mode of STA1 1302 through the corresponding data field 1310, and, afterwards, in case UL MU communication is performed from the AP 1301 through a trigger frame 1330, information on the transmit operating mode may be used. More specifically, the AP 1301, which intends to receive an uplink PPDU from multiple STAs including STA1 1302, may ensure a TXOP 1325 via contending, and so on, and then the AP 1301 may transmit a trigger frame 1330 to the multiple STAs. An example of the trigger frame may be configured in accordance with the example shown in FIG. 9 to FIG. 11. More specifically, the AP 1301 may be configured to transmit an uplink PPDU 1341 to STA1 1302 through the trigger frame 1330 by using a specific RU, and, herein, in case a bandwidth (i.e., RU) for the uplink PPDU 1341 is allocated, the Channel Width subfield 1220, which is indicated in the data field 1310, may be used. Additionally, the AP 1301 may indicate a number of spatial streams that may be used for the uplink PPDU 1341 to STA1 1302 through the trigger frame 1330. In this case, the number of spatial streams that are used by STA1 1302 for the uplink PPDU 1341 may be signaled through a subfield, which is newly configured in the per user information field of FIG. 11.

In summary, when the AP 1301 transmits the trigger frame 1330, uplink PPDUs 1341 and 1342 are received from multiple STAs through a communication method and a radio resource that are indicated by the trigger frame 1330.

Herein, the communication method and radio resource that are indicated by the trigger frame 1330 may be determined based on the information related to the operating mode, which has already been reported to the AP 1301. More specifically, it is preferable that the number of spatial streams for STA1 1302 indicated in the trigger frame 1330 is determined to be equal to or smaller than a value of the Tx NSS subfield 1240, which is indicated by the control information 1200 being carried through the data field 1310. Additionally, it is preferable the frequency band (i.e., RU) for STA1 1302 that is indicated by the trigger frame 1330 is determined to be equal to or smaller than a value of the Channel Width subfield 1220, which is indicated by the control information 1200 being carried through the data field 1310.

Meanwhile, it may be possible that STA1 1302 does not participate in the UL MU communication for diverse reasons. In this case, by setting the UL MU Disable subfield 1230 of the control information 1200, which is carried through the data field 1310, to a specific value (e.g., "1"), this may allow the AP 1301 to notify that STA1 1302 cannot participate in the UL MU communication. In case the UL MU Disable subfield 1230 corresponding to STA1 1302 is set to the specific value, the AP 1301 may not allocate uplink PPDUs 1341 and 1342 corresponding to the trigger frame for the corresponding STA1 1302.

Figure 14:
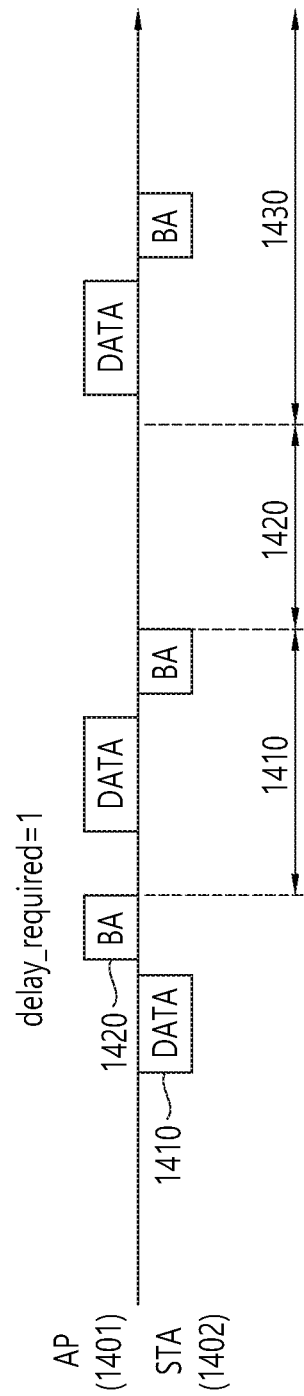
FIG. 14 illustrates an example of the reported operating mode being used for receiving operations of a specific STA.

FIG. 14 illustrates an example of the reported operating mode being used for receiving operations of a specific STA.

In case the operating mode shown in FIG. 12 is reported, i.e., in case the second STA 1402 reports the operating mode to the first STA 1410, it is preferable that the application time of the reported operating mode is indicted clearly. The example of FIG. 14 corresponds to an example relates to a case when the second STA 1402 corresponds to a Non-AP STA and the first STA 1401 corresponds to an AP.

In the example of FIG. 14, in case the operating mode shown in FIG. 12 is reported through the data field 1410, the AP 1401 may already have downlink data stored in its queue. The downlink data that are already in storage are not required to be transmitted to the PPDU according to the operating mode (i.e., "new operating mode"), which was reported through the data field 1410. In other words, transmitting the downlink data that are already in storage to the PPDU according to the "previous (or old) operating mode" may be helpful in decreasing latency and enhancing MU throughput.

Accordingly, the example of FIG. 14 proposes a method of indicating whether or not to delay the application of the operating mode (i.e., new operating mode) that was reported by the AP 1401. More specifically, when the STA 1402 reports the new operating mode through the data field 1410, the AP 1401 transmits a block ACK 1420 in response to the corresponding data field 1410. Information on whether or not the application of the new operating mode is being delayed is indicated in the corresponding BA 1420. More specifically, in case the "delay_required" is indicated by a specific value (i.e., "1"), the AP 1401 may transmit a PPDU to the STA 1402 by using the previous (or old) operating mode instead of the new operating mode during a predetermined delay time 1410. Meanwhile, after the delay time 1410, a transition time 1420 may exist. During the transition time 1420, the AP 1401 may shift its operating mode from the previous (or old) operating mode to the new operating mode. After an elapse of the transition time 1420, the AP 1401 may transmit a PPDU to the STA 1402 in accordance with the new operating mode that is reported through the data field 1410.

The delay time and/or transition time of FIG. 14 may be negotiated through a management frame, and an example of such management frame may include an association request/response. Since such delay time and/or transition time are/is not required to exist, the length of the corresponding time(s) may be set to "0". Additionally, the delay time and/or transition time may be negotiated through a MAC header (e.g., HE control field, etc.), which is included in the data field 1410. For example, the STA 1402 may set the length of the delay time and/or transition time to "0" in the data field 1410, and, in this case, the AP 1401 may apply the operating mode without the delay time and/or transition time.

Figure 15:
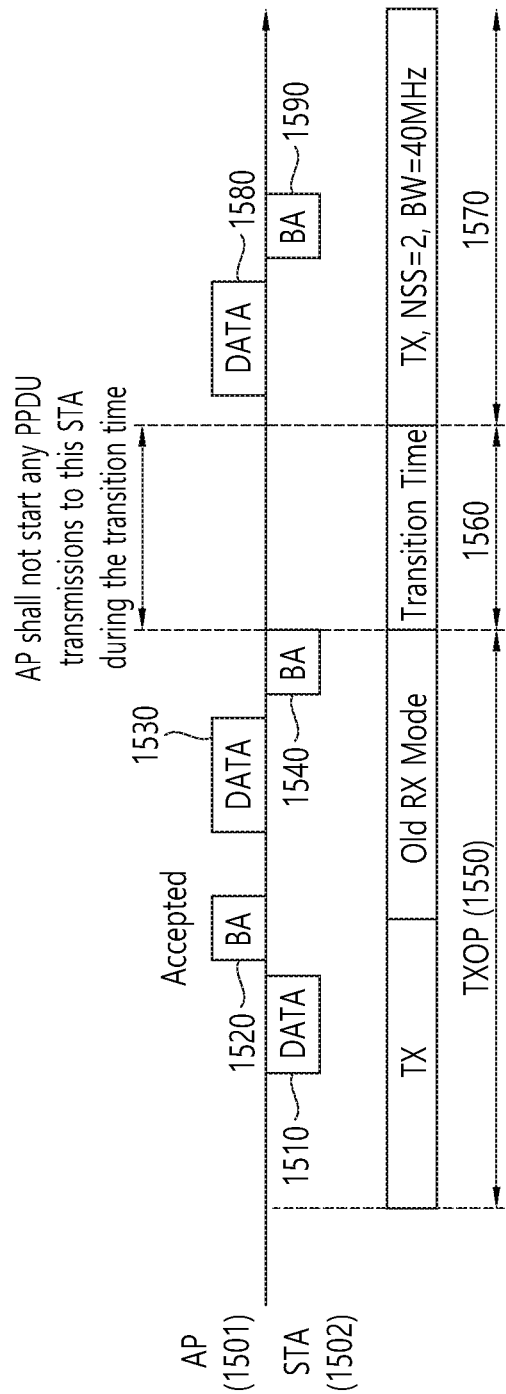
FIG. 15 illustrates an additional example of the reported operating mode being used for the receiving operations of a specific STA.

FIG. 15 illustrates an additional example of the reported operating mode being used for the receiving operations of a specific STA. The example of FIG. 15, which is similar to the example shown in FIG. 14, corresponds to an example of delaying the application of a new operating mode. The example of FIG. 15 corresponds to an example of not applying the new operating mode during an implicitly indicated time period (or time interval), e.g., during a transmission opportunity (TXOP). The term TXOP is a term, which is well-known to anyone skilled in fields relevant to wireless LAN systems, and which is defined as an interval of time during which a particular STA has the right to initiate frame exchange sequences onto the wireless medium.

The example of FIG. 15 may be applied to different STAs. For example, FIG. 15 shows an example in which a first STA 1501 corresponds to an AP STA and a second STA 1502 corresponds to a non-AP STA.

More specifically, the AP 1501 or STA 1502 may ensure a first TXOP 1550 via contending, and, afterwards, the STA 1502 may report a new operating mode to the AP 1501 while transmitting a PPDU including a data field 1510 to the AP 1501. For example, the Rx NSS subfield 1210 may indicate 2(two) receiving spatial streams (RX NSS=2) through the control information 1200, which is included in the data field 1510, and a Channel Width subfield 1220 may indicate a bandwidth of 40 MHz. Thereafter, the AP 1501 transmits a Block ACK 1520 in response to the corresponding data field 1510.

Since the example shown in FIG. 15 corresponds to an example of not applying the new operating mode during an implicitly indicated time interval (or time period), additional signaling related to the delay time is not required in the Block ACK 1520. In case a PPDU 1530 for the STA 1502 is configured during the first TXOP 1550, the AP 1501 delays the application of the received control information 1200 so that the new operating mode is not applied during the first TXOP 1550. Accordingly, instead of having the newly received control information 1200 applied thereto, the operating mode that has been applied since earlier is applied to the PPDU 1530, which is configured in the first TXOP 1550 period (or interval). If the PPDU 1530 is successfully received, the STA 1502 may transmit a Block ACK 1540.

After the termination of the first TXOP 1550, during which indication information (i.e., a subfield of the control information 1200 being included in the data field 1510) indicating the change in the operating mode is carried (or delivered) to the AP 1501, the indication information (i.e., a subfield of the control information 1200 being included in the data field 1510) that has already been carried (or delivered) is applied. Similarly to the example shown in FIG. 14, although a transition time 1560 for the AP 1501 may be applied, immediately after the first TXOP 1550, such transition time 1560 is not required and may be omitted. During the corresponding transition time 1560, the AP 1501 may not transmit any PPDUs in order to apply the new operating mode.

After the termination of the above-described first TXOP 1550, a new second TXOP 1570 may be acquired by the AP 1501/STA 1502. Since a time period (or interval), during which the application of the new operating mode is delayed, is limited to the first TXOP 1550, a PPDU that is configured by the AP 1501 during the second TXOP 1570 is configured based on the new operating mode, even if there is no separate signaling. In the example of FIG. 15, since the Rx NSS subfield 1210 indicates 2(two) receiving spatial streams (RX NSS=2) through the control information 1200 that is included in the data field 1510, and since the Channel Width subfield 1220 indicates a bandwidth of 40 MHz, a new PPDU 1580 is configured based on such indications. The STA 1502 receives the newly configured PPDU 1580 and transmits a Block ACK 1590 in response to the received PPDU 1580.

A mechanism for indicating an operating mode in the present specification is illustrated below.

First, an ROM indication method is described. In the suggested method, STA 2, which has received ROM indication information from STA 1, reports using reserved bits of a BA/ACK (or multi-TID BA, OFDMA-BA, or the like) whether to accept or deny an ROM. According to the method suggested in the present specification, STA 2 indicates an appropriate ROM for STA 1.

For example, reserved bits (8 bits) in a BA Control field may be used as follows.

1 bit: Indicator indicating whether STA 2 accepts or denies an ROM requested by STA 1

1 bit: Indicator indicating whether STA 2 transmits an appropriate ROM for STA 1 (applied similar to an ROM request bit)

3 bits: The number of receiving spatial streams 3 bits: A receiving channel bandwidth If STA 2 accepts the ROM, STA 2 may omit transmitting relevant information, such as an indicator indicating whether STA 2 transmits an appropriate ROM for STA 1, the number of receiving spatial streams, and a receiving channel bandwidth. Further, if STA 2 accepts the ROM, STA 2 may retransmit the ROM information for confirmation.

Alternatively, STA 2 may report the foregoing information further using reserved values among Multi-TID, Compressed Bitmap, and GCR bits.

Alternatively, STA 2 may transmit a BA frame using reserved bits, thereby reporting whether to accept or deny the ROM received from STA 1. Further, STA 2 may transmit a BA frame to report whether to transmit an appropriate ROM for STA 1. Here, STA 2 may transmit appropriate ROM information using a BA Information field. That is, STA 2 may transmit information on the number of receiving spatial streams or a receiving channel bandwidth.

Alternatively, STA 2, which has received the ROM from STA 1, may report whether to accept or deny the ROM and whether to transmit an appropriate ROM using a multi-TID BA (M-BA) frame.

For example, a TID value of the BA Information field is predefined as a specific value (for example, 0 or 1). When the TID value is set to the specific value, a Block ACK Starting Sequence Control field and/or Block ACK Bitmap field as subfields of the BA Information field may be omitted. Alternatively, a field transmitted following the TID Value field may be defined as a new field indicating the ROM.

Although the foregoing method has been described as indicating whether STA 2 accepts or denies the ROM requested by STA 1 and whether STA 2 transmits an appropriate ROM, the present invention is not limited thereto.

STA 2 may transmit ROM information for STA 1 through an MAC Header of a frame (for example, a data frame, a BA/ACK frame, or the like) transmitted by STA 2 or via piggyback. The ROM information may be channel information and the number of spatial streams for STA 2 to transmit a trigger frame for STA 1 to be subjected to UL MU.

For example, when STA 2 applies UL MU for STA 1, STA 2 may transmit bandwidth or channel information and information on the number of spatial streams through a BA/ACK (or M-BA, OFDMA-BA, or the like) as a response frame to a UL data frame transmitted by STA 1. Alternatively, STA 2 may transmit bandwidth or channel information and information on the number of spatial streams through a frame (for example, a data frame) transmitted from STA2 to STA 1. The bandwidth or channel information may correspond to information used for STA 2 to transmit a next trigger frame for STA 1. When such information is received, STA 1 may perform a subsequent receiving operation according to an ROM indicated by STA 2.

Next, a TOM indication method is described. That is, a method described in the present specification is not limited to the foregoing ROM changing operation but may also be applied to a TOM changing operation.

An 802.11ax system allows an STA to arbitrarily perform UL access to a specific resource for converge extension in view of an outdoor environment. Here, it is needed to change a TOM in which the STA performs transmission. For example, some STAs performing random access may access an AP using only 26 tones. When the STA receives a trigger frame (for random access) and transmits a UL frame, the STA may transmit information on a TOM of the STA (for example, the maximum RU size, a channel bandwidth, or the number of spatial streams for access to the AP) using reserved bits or a newly defined method. The reserved bits may correspond to reserved bits in a newly defined field or frame (ACK/BA, data buffer status report, or the like) of the MAC Header.

Further, an indicator bit indicating an ROM/TOM may be added to indicate an ROM and a TOM using the same format. For example, it may be predefined that the indicator bit set to 1 indicates a TOM and the indicator bit set to 0 indicates an ROM. When the TOM information is received from the STA, the AP may accept or deny whether to change the TOM of the STA. When the AP schedules UL MU transmission of the STA using the TOM information, the AP may transmit a trigger frame for the UL MU transmission of the STA considering the TOM information. Here, the AP may allocate an RU unit with a size equal to or smaller than the maximum RU size for access to the AP, which is transmitted by the STA, as an RU unit of a UL MU resource for the STA. Alternatively, the AP may allocate UL MU resources to transmit a smaller number of spatial streams than the number of spatial streams which is transmitted by the STA.

When the STA reports that the maximum RU size for the STA to access the AP is 52 tones, the AP may allocate 52 tones or 26 tones when allocating UL MU resources for the STA.

Next, a method of transmitting a preferred RU size and a preferred MCS via a buffer status report and transmitting a TXOP length calculated based on the RU size and the MCS is described.

When the STA performs a buffer status report upon receiving a trigger frame (for random access), the STA may report to the AP an RU size preferred by the STA (or the maximum RU size for access to the AP) and an MCS preferred by the STA (which may be omitted if being the same as an MCS used to transmit a buffer status report, or the maximum MCS level available for the STA). In addition, the STA may transmit a TXOP length determined based on the RU size and the MCS level preferred by the STA, thereby reporting the amount of buffered data of the STA to the AP.

Next, a backoff procedure is described.

After transmitting the ROM information (when the STA transmits ROM information on the STA or requests ROM information on an STA linked to the STA), the STA receives a response frame (ACK/BA, M-BA, OFDMA BA, data, or the like) to the ROM information. Here, data is included when accepting the ROM or receiving information on an appropriate operating mode. In this case, the STA may change the ROM after a predefined outage time, and accordingly the transmitting STA may transmit a frame (for example, a data frame) in view of the changed ROM of the STA linked to the transmitting STA.

Here, the transmitting STA defers a backoff procedure during the outage time and performs the backoff procedure after the outage time.

Next, a method for the AP to manage conditions for triggering the ROM/TOM report of the STA is described.

The AP (or STA) may manage conditions for triggering the report of TOM/ROM information by the STA so that the STA transmits TOM/ROM information thereof.

For example, in order that the STA is triggered to transmit ROM information when a battery is a specific threshold or less, the AP may transmit the specific threshold using a beacon, a trigger frame, a management frame, or the like.

Alternatively, the AP may report using a beacon, a trigger frame, a management frame, or the like that the STA is allowed to transmit ROM information only when the STA turns off an RF chain (for example, the bandwidth is changed from 160 MHz to 80 MHz).

Further, the AP may report using a beacon, a trigger frame, a management frame, or the like that the STA is allowed to transmit TOM/ROM information only in a specific interval when a beacon interval is divided into an OFDMA interval and an EDCA interval or into a legacy interval and an 11ax interval.

For another example, in order that the STA is triggered to transmit TOM information when the RSSI (or SNR, SNIR, or the like) of a signal from the AP is a specific threshold or less, the AP may transmit the specific threshold using a beacon, a trigger frame, a management frame, or the like.

Next, a method of reporting ROM change time is described.

When an AP has DL data for an STA requesting an ROM change, the AP may transmit the DL data to the STA according to the previous ROM of the STA in order to improve the throughput of the DL data. In particular, when the DL data for the STA is MU-transmitted, the AP may perform the above operation to obtain an MU gain.

The AP may defer ROM change time transmitted from the STA for a specified time using a DL frame (for example, a BA/ACK/M-BA/OFDMA BA or data frame).

The AP reports the specified time using various methods.

First, the AP may directly report an outage time value. The AP may directly transmit the outage time value to the STA along with information indicating the acceptance of the ROM change request. Here, the outage time value may be transmitted through an MAC header, using a reserved bit of a BA/ACK/M-BA/OFDMA BA, or reusing a specified field in a similar manner to that mentioned above. Alternatively, the outage time value may be transmitted through a field newly defined for the STA supporting an HE system.

Further, the outage time may be predefined. The AP may report using a DL frame (for example, BA/ACK/M-BA/OFDMA BA or data frame) whether the STA applies the outage time and changes the ROM after the outage time, or changes the ROM upon receiving a frame including the information indicating the acceptance of the ROM change request. The following values may be defined as the outage time.

Duration of current TXOP period

Duration of remaining TXOP period (in this case, the STA may change the ROM in the next TXOP)

Duration of Max TXOP period

Service Period

Remaining time to next beacon target transmission time (that is, the STA may change the ROM in the next beacon interval)

Remaining time to later beacon target transmission time (the AP may indicate which beacon interval)

Next, a method of indicating an ROM change in the 11ax system is described.

An STA may transmit ROM information via an MAC header of a control frame, a data frame or a management frame, or a PSDU in order to change an ROM thereof. Here, the ROM information reported by the STA may include channel bandwidth information, tone information, RU information, or the number of receiving streams. Further, the STA may further define an RX mode Request bit in order to indicate that the ROM information is for requesting an ROM change.

When the STA includes the MAC header reporting this information, the STA may report using a reserved bit in an HT variant field or VHT variant field of a HT control of the MAC header that a field transmitting the ROM information is transmitted through the MAC header.

Here, when STA 1 transmits the ROM information, STA 2 receiving this information may report using a BA/ACK (or an M-BA or OFDMA-BA) whether to accept or reject the information. Specifically, STA 2 may use a reserved bit of a BA/ACK (or an M-BA or OFDMA-BA).

Alternatively, STA 2 may transmit an RX mode Request bit set to 1 in order to change the ROM of STA 1. STA 1 receiving the RX mode Request bit may report using a BA/ACK (or an M-BA or OFDMA-BA) whether to accept or reject the ROM requested by STA 2. Specifically, STA 1 may use a reserved bit of a BA/ACK (or an M-BA or OFDMA-BA).

Figure 16:
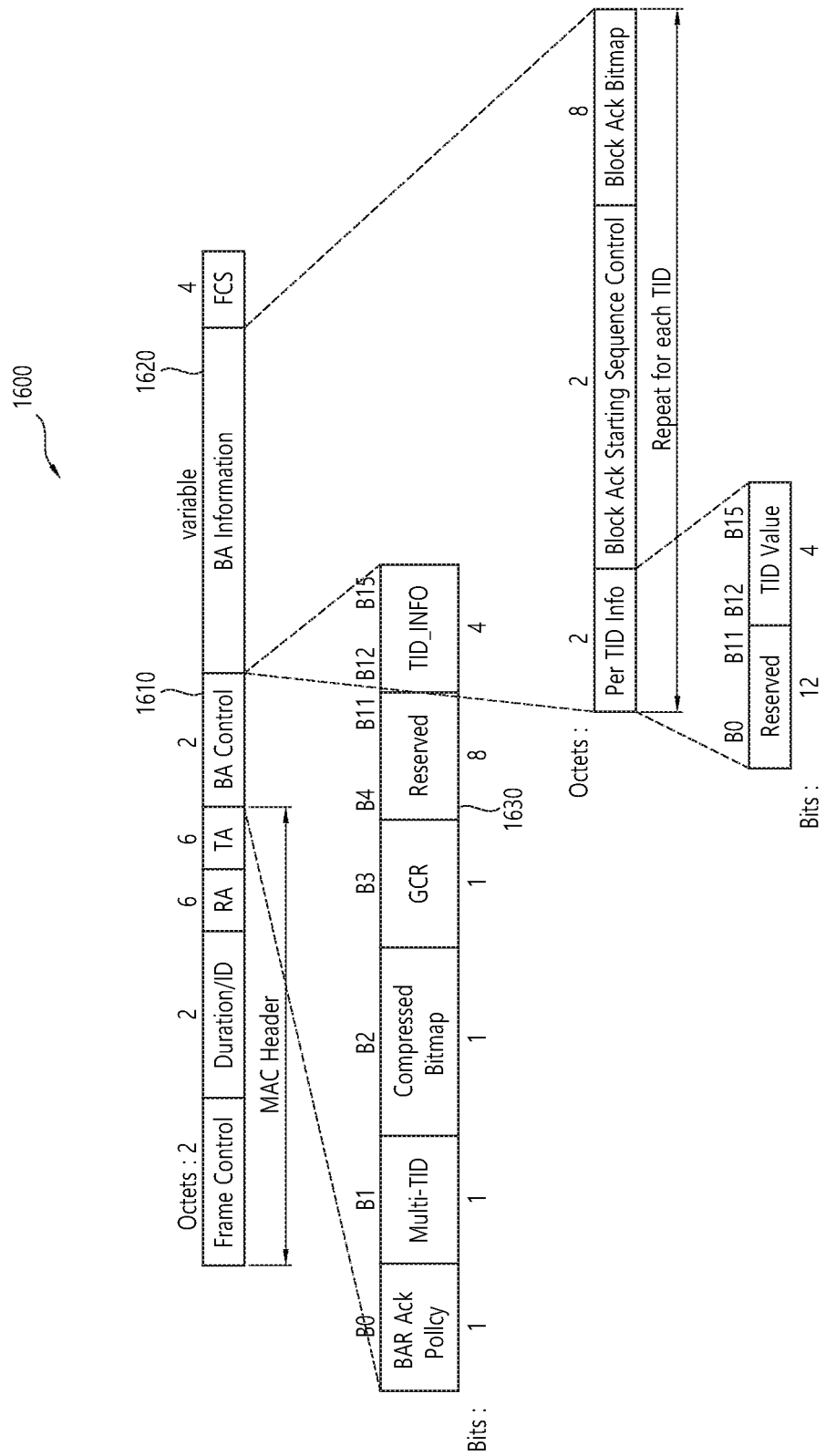
FIG. 16 illustrates an example of a BA frame for a plurality of STAs.

FIG. 16 illustrates an example of a BA frame for a plurality of STAs. For an operating process, the AP transmits a BA in response to data transmitted from an STA. The BA may indicate using reserved bits of the BA whether there is buffered data in order to indirectly respond to an ROM request from the STA. Here, the reserved bits correspond to a more bit of an MAC Header in the data, wherein a more bit (1 bit) is added to the BA.

The BA frame in FIG. 16 may correspond to an M-BA supported in the 802.11ax system. Referring to FIG. 16, the BA frame 1600 includes a plurality of subfields including a BA Control field 1610 and a BA Information field 1620. The BA Control field 1610 is a common control field and the BA Information field 1620 is a user-specific field. That is, the BA Information field 1620 may be transferred to each different STA. The more bit corresponds to 1 bit among reserved bits 1630 (B4 to B11) in the BA Control field 1610.

That is, the AP may indicate that there is remaining data to transmit to a specific STA using 1 bit among the reserved bits 1630 included in the BA frame 1600, like a more bit of a data MAC header. 1 bit of the reserved bits 1630 may be referred to as the more bit, a more data bit, or a delay required bit.

Figure 17:
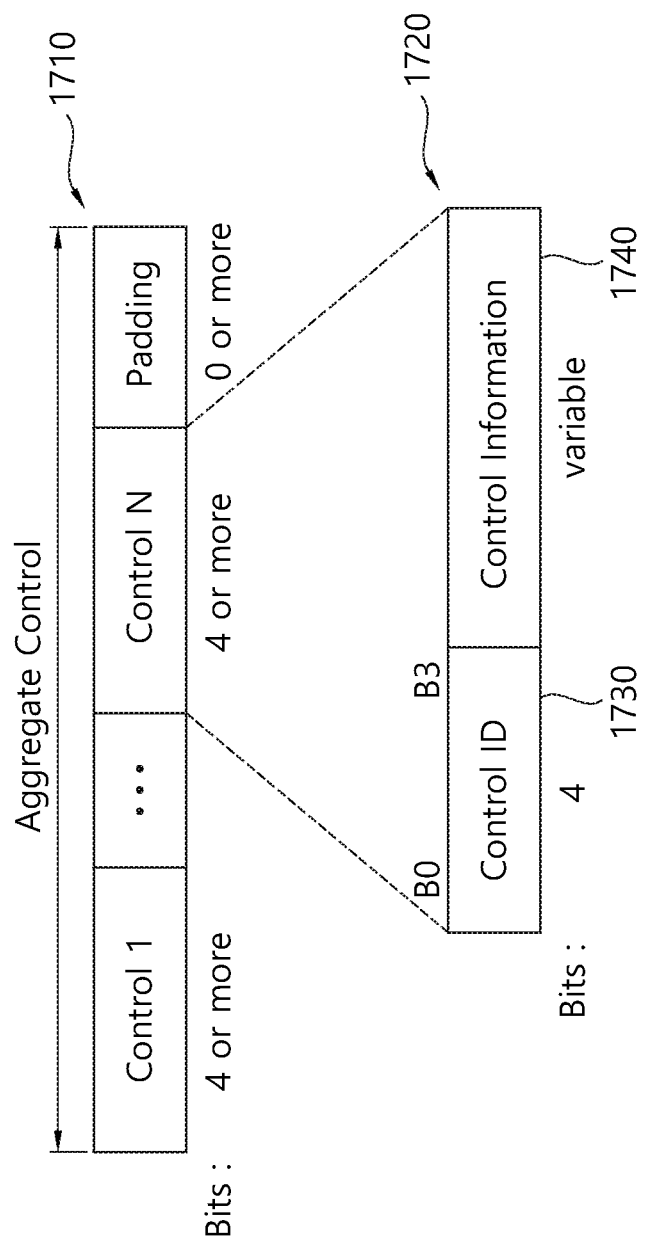
FIG. 17 illustrates an example of an Aggregated-Control (A-Control) field used to transfer control information.

FIG. 17 illustrates an example of an Aggregated-Control (A-Control) field used to transfer control information.

An STA requests an ROM from an AP to save power. The ROM request may be transmitted through a QoS Null frame or A-Control field. Further, the ROM request may also be transmitted through a QoS Data frame, which will be described.

The A-Control field is illustrated in FIG. 17. The A-Control field 1710 is a subfield of an MAC Header (for example, an HE control field), which is a control field further added following a QoS Control field in the 802.11ax system. The A-Control field 1710 includes at least one sequence of Control subfields (1720-1, 1720-2, . . . , and 1720-N). A Control subfield 1720-1 with a Control ID subfield 1730 equal to 0 is a first subfield of the sequence.

The Control ID subfield 1730 indicates the type of information transferred in a Control Information subfield 1740. The Control Information subfield 1740 has a fixed length for each value of the Control ID subfield 1730 that is not deferred. The value of the Control ID subfield 1730 and the length of the Control Information subfield 1740 related to the value of the Control ID subfield 1730 are defined as in the following table.

TABLE 1

| Control ID value | Meaning | Length of the Control Information subfield (bits) |
|---|---|---|
| 0 | UL MU response scheduling | 26 |
| 1 | Operating Mode | 12 |
| 2 | HE link adaptation | 16 |
| 3 | Buffer Status Report (BSR) | 26 |
| 4 | UL Power Headroom | 8 |
| 5 | Bandwidth Query Report (BQR) | 10 |
| 6-15 | Reserved | |

Referring to Table 1, when the Control ID subfield 1730 is equal to 1, the Control Information subfield 1740 includes information related to an operating mode change of an STA transmitting a frame including information on an operating mode indication. That is, the format of the Control Information subfield 1740 in the case where the Control ID subfield 1730 is equal to 1 is illustrated in FIG. 12.

This specification proposes a signaling method for an STA to apply an ROM or a TOM through a reported operating mode.

Figure 18:
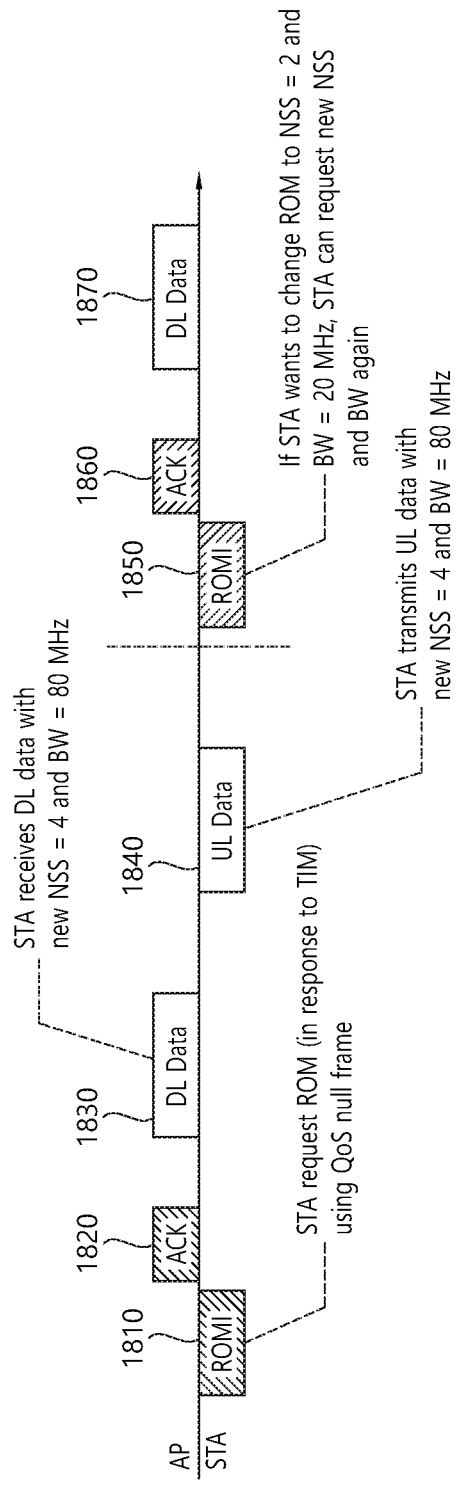
FIG. 18 illustrates an example in which a reported operating mode is applied as an ROM or a TOM.

FIG. 18 illustrates an example in which a reported operating mode is applied as an ROM or a TOM.

When an STA changes an ROM using an ROMI, the number of spatial streams (NSS) and a receiving bandwidth (BW), which are changed, may be used in the TOM. That is, the receiving bandwidth and the number of spatial streams used in the ROM may be used equally in the TOM. Here, Rx NSS and Rx BW values in the ROM may be represented by (Rx NSS, Rx BW). Tx NSS and Tx BW values in the TOM may be represented by (Tx NSS, Tx BW).

Referring to FIG. 18, the STA may transmit an ROMI 1810 to request an ROM change. When the STA receives an ACK 1820 of the ROMI, the STA may receive DL data 1830 by applying new Rx values (4, 80). Here, the STA may use the number of spatial streams and the receiving bandwidth (4, 80) which are changed through the ROMI 1810 in the TOM. Thus, the STA may transmit UL data 1840 using the number of spatial streams and the received bandwidth (4, 80) which are newly applied in the ROM.

Further, when the STA wants to change the Rx values through the ROM while operating in the TOM, the STA may transmit an ROMI again and may change the Rx values. That is, the STA may transmit an ROMI 1850 to request an ROM change. When the STA receives an ACK 1860 of the ROMI, the STA may receive DL data 1870 by applying new Rx values (2, 20).

Figure 19:
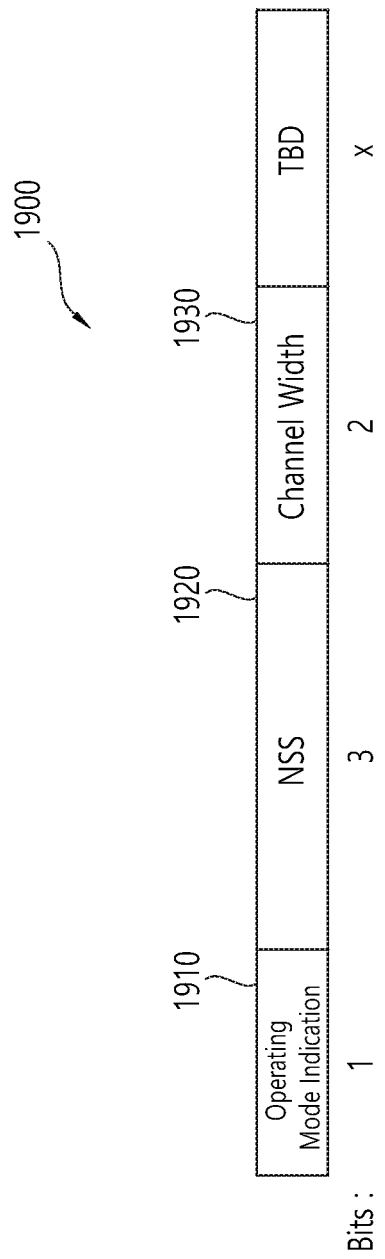
FIG. 19 illustrates another example of control information used to report an operating mode.

FIG. 19 illustrates another example of control information used to report an operating mode.

To use a receiving bandwidth and the number of spatial streams, which are the same as those used in the RON, in the TOM, an operating mode indicator to indicate the ROM or the TOM may be included in control information used to report an operation mode.

That is, an operating mode indicator 1910 of FIG. 19 may indicate whether an OMI 1900 operates as an ROMI or a TOMI. When the operating mode indicator 1910 uses only one bit and the bit of the operating mode indicator 1910 indicates 0, the number of spatial streams 1920 and a channel bandwidth 1930 may be used as Rx values for an ROM change. When the bit of the operating mode indicator 1910 indicates 1, the number of spatial streams 1920 and the channel bandwidth 1930 may be used both as Rx values for an ROM change and as Tx values for a TOM change.

When the operating mode indicator 1910 uses two bits, it is possible to further subdivide an operation. When the bits of the operating mode indicator 1910 indicate 01, the number of spatial streams 1920 and the channel bandwidth 1930 may be used as Rx values for an ROM change. When the bits of the operating mode indicator 1910 indicate 10, the number of spatial streams 1920 and the channel bandwidth 1930 may be used as Tx values for a TOM change. When the bits of the operating mode indicator 1910 indicate 11, the number of spatial streams 1920 and the channel bandwidth 1930 may be used both as Rx values for an ROM change and as Tx values for a TOM change. When the bits of the operating mode indicator 1910 indicate 01, the operating mode indicator 1910 may remain as reserved bits.

This specification proposes a method for solving the problem of ROM signaling failure. Specifically, an STA transmits an ROM request to change Rx values (i.e., Rx NSS and Rx BW), and an AP transmits an ACK/BA in response to the ROM request. However, when the AP transmits the ACK/BA but the STA fails to receive the AC IBA, the STA cannot change an ROM.

Figure 20:
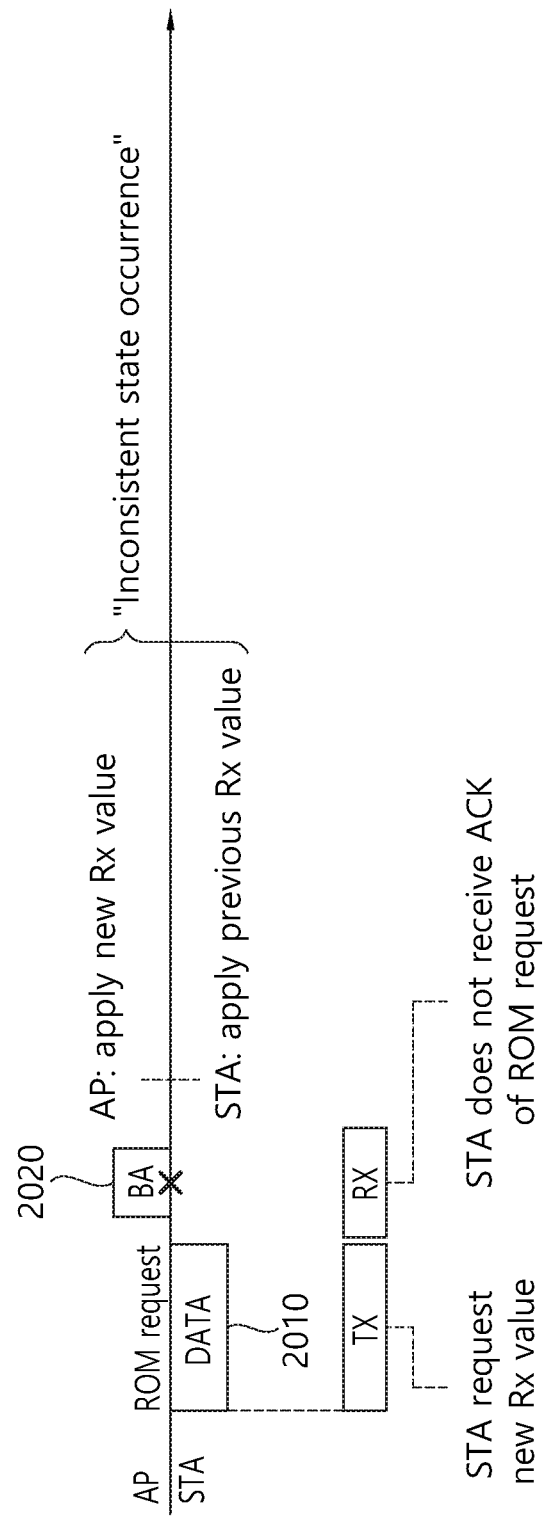
FIG. 20 illustrates an example in which disagreement in operating mode occurs between an AP and an STA.

FIG. 20 illustrates an example in which disagreement in operating mode occurs between an AP and an STA.

In FIG. 20, it is assumed that the STA has requested an ROM change (2010) but has not received an ACK/BA 2020 of the ROM change from the AR The STA has not received the ACK/BA 2020 from the AP because a collision has occurred during the transmission of the ACK/BA 2020.

Referring to FIG. 20, since the STA has not received the ACK/BA 2020 of an ROMI, the STA cannot change an ROM. However, the AP may change the ROM as requested by the STA after transmitting the ACK/BA 2020 of the ROMI. That is, the STA applies Rx values before the change and the AP applies new Rx values after the change, and thus disagreement in operating mode occurs between the AP and the STA.

Hereinafter, a method for performing an ROM change to solve the above disagreement in operating mode will be described with reference to two embodiments. Embodiment 1 illustrates a case of reducing Rx NSS and Rx BW through an ROM request, and Embodiment 2 illustrates a case of increasing Rx NSS and Rx BW through an ROM request.

Embodiment 1: Case of Reducing Rx NSS and Rx BW Through ROM Request

Figure 21:
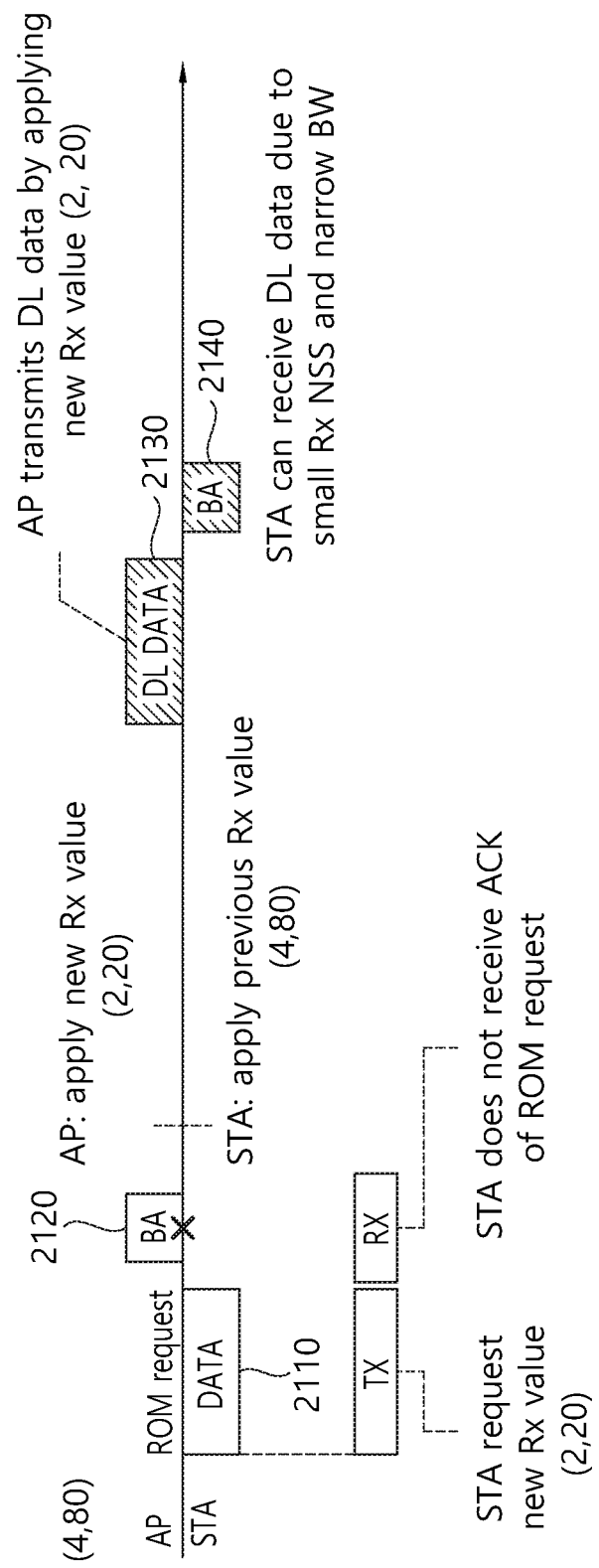
FIG. 21 illustrates an example in which disagreement in operating mode occurs when the number of spatial streams and a receiving channel bandwidth in a reported operating mode are reduced.

FIG. 21 illustrates an example in which disagreement in operating mode occurs when the number of spatial streams and a receiving channel bandwidth in a reported operating mode are reduced.

FIG. 21 illustrates a procedurein which an STA receives DL data after the occurrence of disagreement in operating mode described in FIG. 20. That is, the STA requests an ROM change 2110 but does not receive an ACK/BA 2120 of the ROM change from an AP due to the occurrence of a collision during transmission by the AP. Rx NSS and Rx BW values in an ROM may be represented by (Rx NSS, Rx BW). The STA has (4, 80) in the ROM before the ROM change, but the STA intends to reduce the values in the ROM to (2, 20) through the ROM request.

Referring to FIG. 21, the STA has not received the ACK/BA 2120 of the ROMI and thus cannot change the ROM. However, the AP may change the ROM as requested by the STA after transmitting the ACK/BA 2120 of the ROMI. That is, the STA applies Rx values before the change and the AP applies new Rx values after the change, and thus disagreement in operating mode occurs between the AP and the STA.

In this case, even though the AP transmits DL data 2130 by applying the new Rx values, the STA cannot receive the DL data 2130, because the new Rx values applied by the AP are smaller than the Rx values before the change for the STA. That is, since the AP transmits the DL data 2130 by applying the values smaller than the number of spatial streams (Rx NSS) and a receiving bandwidth (Rx BW) which are currently supported by the STA, the STA cannot receive the DL data 2130 via the number of spatial streams (Rx NSS) and the receiving bandwidth (Rx BW) which are currently supported. Therefore, the STA may transmit a BA 2140 of the DL data.

Embodiment 2: Case of Increasing Rx NSS and Rx BW Through ROM Request

Figure 22:
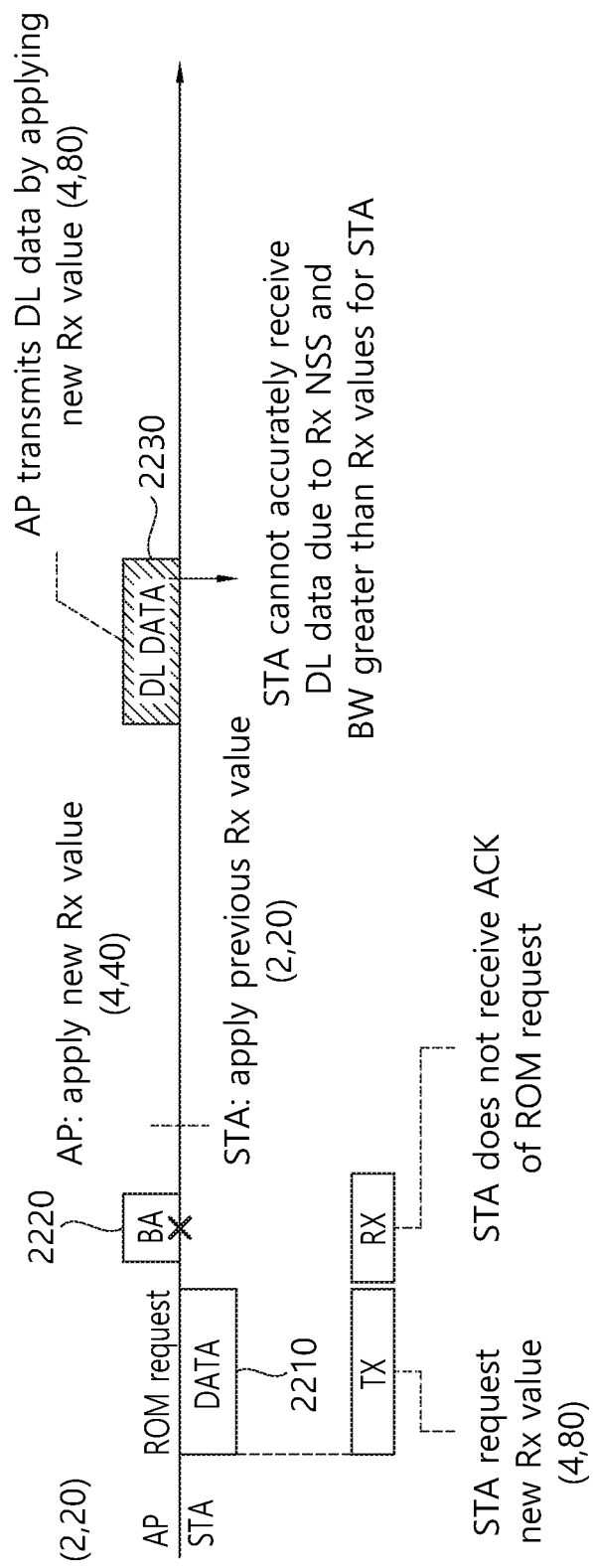
FIG. 22 illustrates an example in which disagreement in operating mode occurs when the number of spatial streams and a receiving channel bandwidth in a reported operating mode are increased.

FIG. 22 illustrates an example in which disagreement in operating mode occurs when the number of spatial streams and a receiving channel bandwidth in a reported operating mode are increased.

FIG. 22 illustrates a procedurein which an STA receives DL data after the occurrence of disagreement in operating mode described in FIG. 20. That is, the STA requests an ROM change 2210 but does not receive an ACK/BA 2220 of the ROM change from an AP due to the occurrence of a collision during transmission by the AP. Rx NSS and Rx BW values in an ROM may be represented by (Rx NSS, Rx BW). The STA has (2, 20) in the ROM before the ROM change, but the STA intends to increase the values in the ROM to (4, 80) through the ROM request.

Referring to FIG. 22, the STA has not received the ACK/BA 2220 of the ROMI and thus cannot change the ROM. However, the AP may change the ROM as requested by the STA after transmitting the ACK/BA 2220 of the ROMI. That is, the STA applies Rx values before the change and the AP applies new Rx values after the change, and thus disagreement in operating mode occurs between the AP and the STA.

In this case, even though the AP transmits DL data 2230 by applying the new Rx values, the STA cannot receive the DL data 2230, because the new Rx values applied by the AP are greater than the Rx values before the change for the STA. That is, since the AP transmits the DL data 2230 by applying the values greater than the number of spatial streams (Rx NSS) and a receiving bandwidth (Rx BW) which are currently supported by the STA, the STA cannot receive the DL data 2230 via the number of spatial streams (Rx NSS) and the receiving bandwidth (Rx BW) which are currently supported. This is because the new Rx values exceed maximum capacities of the number of spatial streams and the receiving bandwidth which the STA can support.

When an STA transmits an ROM request but fails to receive an ACK of the ROM request from an AP or when an ROM change request transmitted by an STA fails, a retransmission procedure for the ROM request is required. This specification proposes a procedure for receiving an acknowledgment using a TOMI in response to the transmission of an ROMI by an STA in order to prevent disagreement in operating mode between the STA requesting an ROM change and an AP (FIG. 20). Accordingly, it is possible to match the operating modes of the STA and the AP.

First, proposed is a method for indicating that an AP and an STA apply different Rx values by adding an ROM request/response bit of one bit to an ROMI field.

Figure 23:
FIG. 23 illustrates still another example of control information used to report an operating mode.

FIG. 23 illustrates still another example of control information used to report an operating mode.

The control information illustrated in FIG. 23 may be used to solve disagreement in Rx value that occurs as an AP transmits DL data using a newly changed Rx value and an STA receives no ACK/BK of an ROM request. That is, an ROM request/response bit 2310 is added to the control information used to report the operating mode, thereby indicating that the AP and the STA apply different Rx values.

Figure 24:
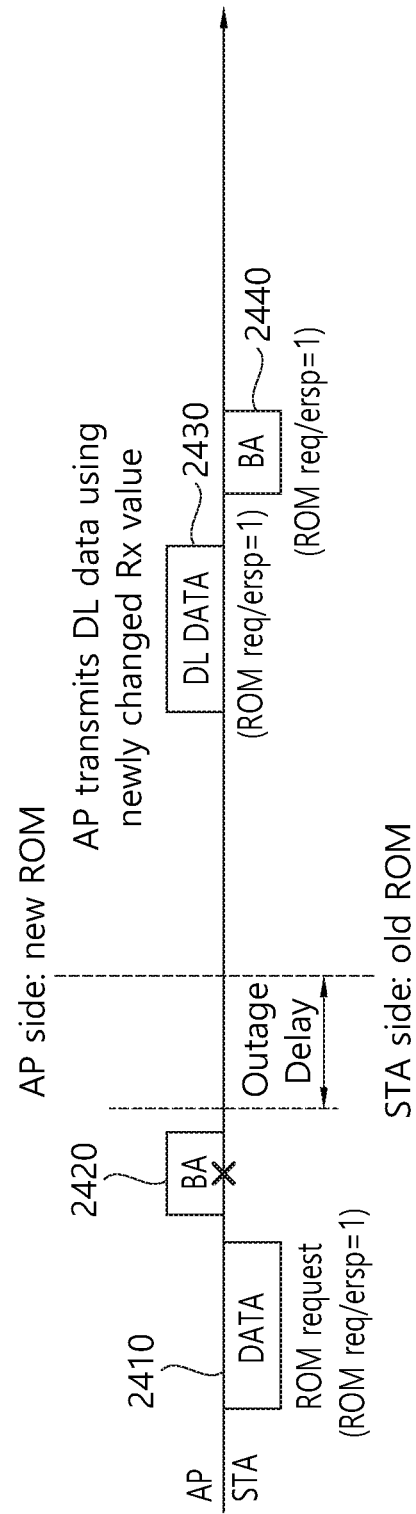
FIG. 24 illustrates an example in which an operating mode reported between an AP and an STA is applied by adding an ROM request/response bit to an ROMI field.

FIG. 24 illustrates an example in which an operating mode reported between an AP and an STA is applied by adding an ROM request/response bit to an ROMI field.

Referring to FIG. 24, an STA may request an ROM change by adding an ROM request/response bit to an ROM request field 2410. Here, it is assumed that the ROM request/response bit indicates 1. When the STA does not receive an ACK/BA 2420, Rx values for an AP and the STA may disagree after an outage delay. However, the AP may transmit an ROM request/response bit along with DL data 2430 using a newly changed Rx value. When the ROM request/response bit transmitted along with the DL data 2430 still indicates 1, the STA can recognize that the AP has transmitted the ACK/BA 2420 of the ROM request 2410 but the STA has not received the ACK/BA 2420, and thus disagreement in operating mode can be solved. That is, when an ROM request/response field transmitted along with the DL data 2430 by the AP is set to 1, the STA recognizes that the AP confirms that the AP uses the Rx value changed according to the ROM request 2410.

Upon receiving the DL data 2430 with the ROM request/response field set to 1, the STA may transmit an ACK/BA 2440 with an ROM request/response field set to 1 in response to the DL data. Accordingly, it may be determined that Rx values for the AP and the STA correspond to each other.

Next, a method for retransmitting an ROMI by defining a TOMI along with the ROMI is proposed.

Figure 25:
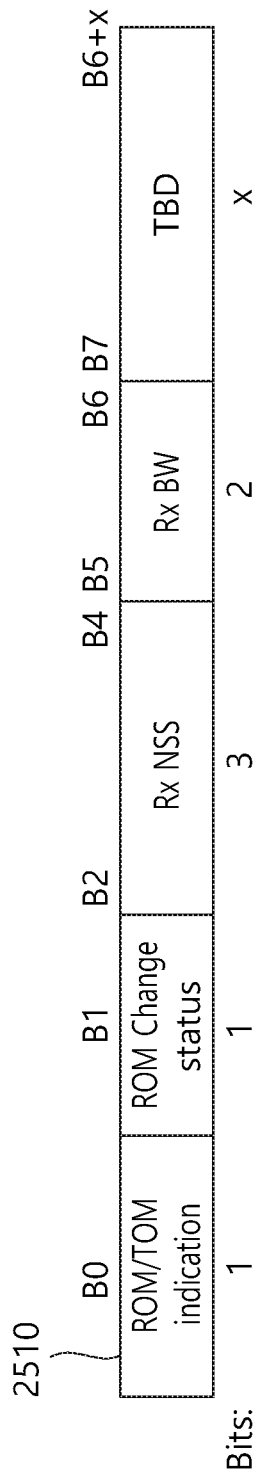
FIG. 25 illustrates yet another example of control information used to report an operating mode.

FIG. 25 illustrates yet another example of control information used to report an operating mode.

In the case where the transmission of an ROMI fails, when an STA retransmits the ROMI and the transmission of the ROMI is finally successful, an ROM change can be performed. However, when a definition of the retransmission of a control frame is not specifically specified and the STA does not retransmit the ROMI, disagreement in operating mode between the AP and the STA continuously occurs. As a result, a power saving problem arises, and a throughput or efficiency problem may arise. Therefore, it is necessary to define retransmission in order to achieve operating mode agreement between the AP and the STA.

Therefore, this specification proposes a TOMI field illustrated in FIG. 25. The TOMI field of FIG. 25 may have the same format as that of an ROMI field. Further, it is possible to specify ROM transmission or TOM transmission via a one-bit ROM/TOM indicator 2510. For example, the ROM/TOM indicator set to 1 may specify ROM transmission, and the ROM/TOM indicator set to 0 may specify TOM transmission. The reverse is also possible.

Hereinafter, any process that may occur after specifying an operating mode through an ROM/TOM indicator will be described. This process can be any process that may occur when ROM transmission is successful and/or when ROM transmission fails.

FIG. 26 illustrates an example in which an operating mode reported between an AP and an STA is applied according to ROMI or TOMI transmission.

Referring to FIG. 26, 1) an STA successfully transmits an ROMI and 2) successfully receives an ACK of the ROMI from an AR Accordingly, 3) after the AP transmits a TOMI, the STA receives the TOMI and successfully transmits an ACK (or ROMI) of the TOMI. The AP may also transmit a TOMI through an MAC header. In this case, since all the frames are successfully transmitted, an ROM change may be normally performed after an outage delay (where outage delay present=1).

Figure 27:
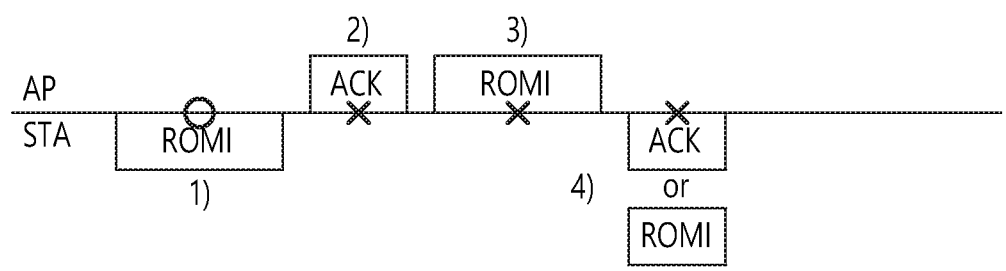
FIG. 27 illustrates another example in which an operating mode reported between an AP and an STA is applied according to ROMI or TOMI transmission.

FIG. 27 illustrates another example in which an operating mode reported between an AP and an STA is applied according to ROMI or TOMI transmission.

Referring to FIG. 27, 1) an STA successfully transmits an ROMI to an AP, the AP transmits an ACK of the ROMI accordingly, but 2) the STA fails to receive the ACK. 3) The AP successfully receives the ROMI and thus transmits a TOMI to the STA. However, the STA fails to receive the TOMI due to disagreement in operating mode with the AP.

That is, the STA successfully transmits the ROMI but fails to receive the ACK of the ROMI. Further, even though the AP transmits the TOMI, 4) the STA fails to receive the TOMI and thus does not transmit an ACK of the TOMI to the AP. Here, the AP has received the ROMI and thus performs an ROM change requested by the STA, whereas the STA fails to receive the TOMI and thus needs to retransmit the ROMI.

When the ROMI is successfully retransmitted, the ROM change can be performed. However, when the STA inevitably uses the previous Rx value instead of attempting to retransmit the ROMI, disagreement in operating mode occurs. In order to prevent this disagreement, when the ROM change fails as in FIG. 27, the STA necessarily needs to retransmit the ROMI.

Figure 28:
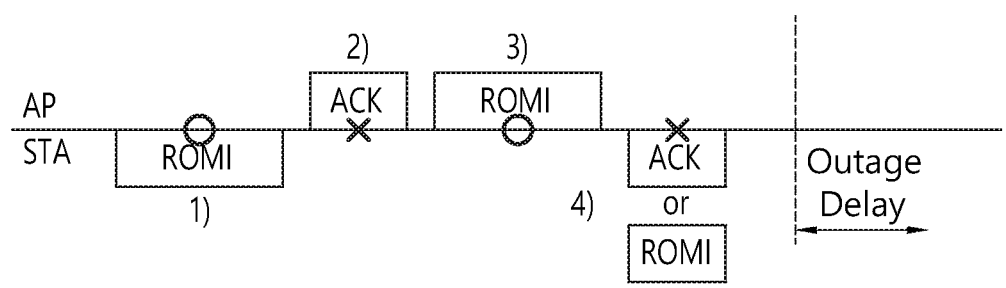
FIG. 28 illustrates still another example in which an operating mode reported between an AP and an STA is applied according to ROMI or TOMI transmission.

FIG. 28 illustrates still another example in which an operating mode reported between an AP and an STA is applied according to ROMI or TOMI transmission.

Referring to FIG. 28, 1) an STA successfully transmits an ROMI to an AP but 2) fails to receive an ACK of the ROMI.

3) Since successfully receiving the ROMI from the STA, the AP transmits a TOMI to the STA. Here, 4) the AP fails to receive an ACK (or ROMI) of the TOMI.

In this case, since the AP receives the ROM change request from the STA and transmits the ACK of the ROM request, the AP performs an ROM change. Further, since the STA transmits the ROM change request and then successfully receives the TOMI in response, the STA performs an ROM change. Thus, even though the transmission of the ACK of the ROMI and the ACK of the TOMI fails, when only the transmission of the ROMI and the TOMI is successfully for the STA and the AP, the ROM change can be performed. Accordingly, the AP and the STA can communicate by applying a new ROM after an outage delay (where outage delay present=1).

Figure 29:
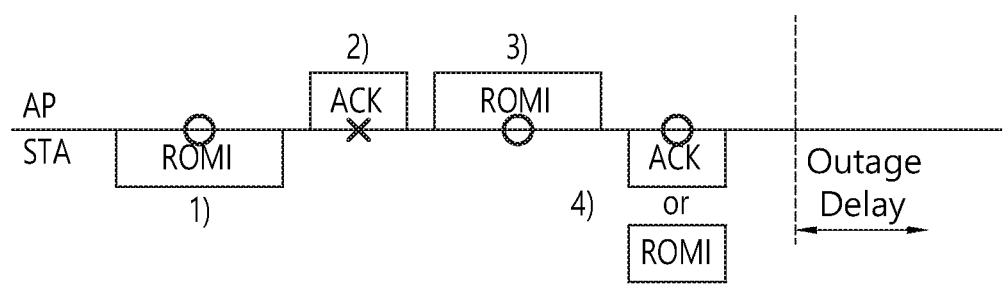
FIG. 29 illustrates yet another example in which an operating mode reported between an AP and an STA is applied according to ROMI or TOMI transmission.

FIG. 29 illustrates yet another example in which an operating mode reported between an AP and an STA is applied according to ROMI or TOMI transmission.

Referring to FIG. 29, 1) an STA successfully transmits an ROMI to an AP but 2) fails to receive an ACK of the ROMI. However, 3) the AP transmits a TOMI, and 4) the STA successfully transmits an ACK of the TOMI to the AP.

In this case, since the AP receives the ROM change request from the STA and transmits the ACK of the request, the AP can perform an ROM change. Further, since the STA receives the TOMI after requesting the ROM change, the STA can transmit data by applying a new ROM after an outage delay (where outage delay present=1).

Figure 30:
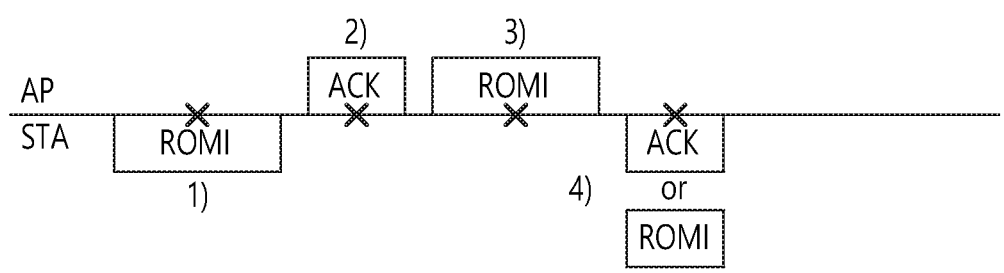
FIG. 30 illustrates still another example in which an operating mode reported between an AP and an STA is applied according to ROMI or TOMI transmission.

FIG. 30 illustrates still another example in which an operating mode reported between an AP and an STA is applied according to ROMI or TOMI transmission.

Referring to FIG. 30, 1) an STA fails to request an ROM change and 2) fails to receive an ACK of the ROM request from the AP. Also, 3) the STA fails to receive a TOMI from the AP, and 4) the AP fails to receive an ACK of the TOMI.

In this case, both the AP and the STA do not perform an ROM change. Here, the STA may attempt to retransmit the ROMI and may continue to communicate via a previous ROM.

Figure 31:
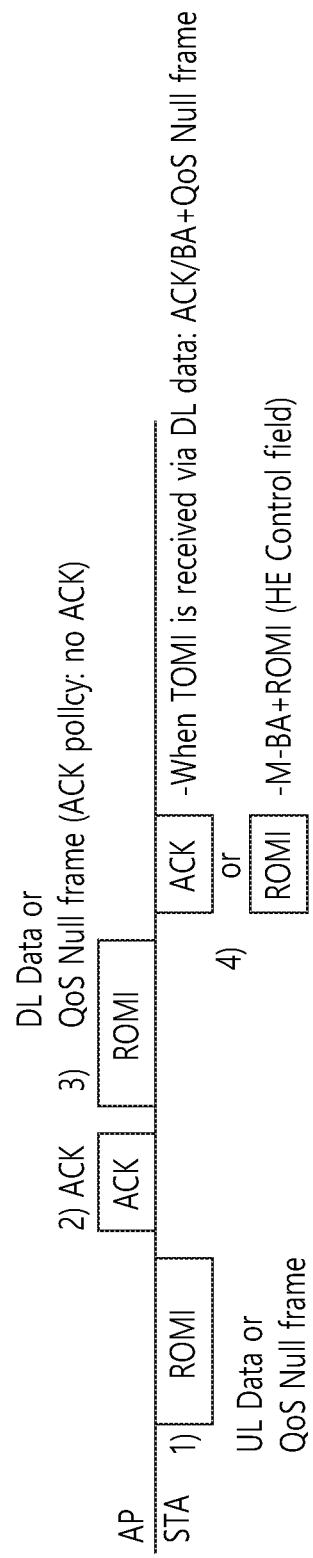
FIG. 31 shows an operation process and signaling information for achieving operating mode agreement by responding via a TOMI to ROMI transmission.

FIG. 31 illustrates an example of signaling to apply an operating mode reported between an AP and an STA is applied according to ROMI or TOMI transmission.

FIG. 31 shows an operation process and signaling information for achieving operating mode agreement by responding via a TOMI to ROMI transmission.

Specifically, 1) an STA may transmit an ROMI through UL data or a QoS null frame. The STA may use the QoS null frame when there is no UL data. 2) An AP transmits an ACK of the ROM request. 3) The AP may transmit a TOMI to the STA through DL data or a QoS null frame. The AP may use the QoS null frame when there is no DL data. In this case, an ACK policy on the QoS null frame may be defined as no ACK.

4) The STA may transmit an ACK or ROMI in response to the TOMI. When the TOMI is transmitted with DL data, the STA transmits an ACK in response to the TOMI. Here, when ACK+QoS null frame is transmitted in an A-MPDU format, an outage delay for an ROM change may be defined through the QoS null frame.

Further, an M-BA may be used to respond to the TOMI. In this case, M-BA+ROMI (HE control field) may be transmitted in a single MPDU format.

When the TOMI is transmitted with a QoS null frame, the STA may also respond with a QoS null frame. Here, when an ACK policy on the QoS null frame is set to no ACK, the STA does not need to receive an ACK of the QoS null frame from the AP. When the ACK policy on the QoS null frame is set to a normal ACK, the STA may receive the ACK of the QoS null frame from the AP.

Figure 32:
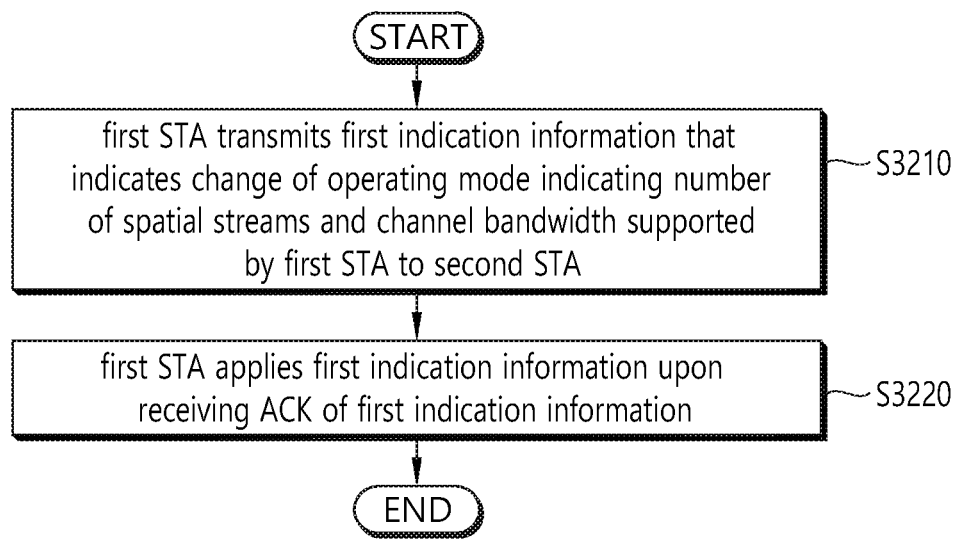
FIG. 32 is a flowchart illustrating a procedure for processing control information for configuring a PPDU according to an embodiment.

FIG. 32 is a flowchart illustrating a procedure for processing control information for configuring a PPDU according to an embodiment.

First, terms used herein are defined as follows. A first STA may correspond to a non-AP STA, and a second STA may correspond to an AP STA that performs communication with the non-AP STA.

In step S3210, the first STA transmits, to the second STA, first indication information that indicates a change of an operating mode indicating the number of spatial streams and a channel bandwidth which are supported by die first STA.

In step S3220, upon receiving an ACK of the first indication information, the first STA applies the first indication information.

The first indication information includes an operating mode indicator indicating whether the operating mode is an ROM or a TOM. That is, the operating mode indicator may be included in an operating mode indication (OMI) field so that the OMI field may indicate whether the number of spatial streams and the channel bandwidth are used for an ROM change or a TOM change.

Therefore, the first indication information that indicates the change of operating mode may correspond to an ROM request (or ROMI) or a TOM request (or TOMI). The first STA makes a request for an ROM change or a TOM change to the second STA. The channel bandwidth may include at least one of 2.0 MHz, 40 MHz, 80 MHz, and 160 MHz.

When the operating mode indicator indicates that the operating mode is the ROM, the first STA may receive a PPDU in the changed operating mode based on the first indication information. That is, the first STA may receive DL data in the changed ROM.

When the operating mode indicator indicates that the operating mode is the TOM, the first STA may transmit a PPDU in the changed operating mode based on the first indication information. That is, the first STA may transmit UL data in the changed TOM.

For example, it is assumed that the operating mode indicator indicates that the operating mode is the ROM. Here, when the first STA does not receive the ACK of the first indication information, the PPDU may be transmitted including an ROM request/response bit. The ROM request/response bit may indicate that the second STA transmits the PPDU in the changed operating mode based on the first indication information. The ROM request/response bit may be further included in the first indication information.

That is, when the first STA makes an ROM request but does not receive an ACK of the ROM request, only the second STA may change the operating mode, resulting in disagreement in operating mode between the first STA and the second STA. To prevent this disagreement, the ROM request/response bit may be generated to notify the first STA in advance that the second STA is transmitting the PPDU in the changed operating mode.

Further, when the first STA does not receive the ACK of the first indication information, the first STA may receive, from the second STA, second indication information that indicates a change of an operating mode indicating the number of spatial streams and a channel bandwidth which are supported by the first STA. Here, the second indication information is transmitted from the second STA and may thus correspond to a TOM request field. The number of spatial streams and the channel bandwidth indicated by the second indication information may be the same as the number of spatial streams and the channel bandwidth indicated by the first indication information. That is, the number of spatial streams and the channel bandwidth used in the ROM may be used equally in the TOM.

The first indication information and the second indication information may be transmitted through a quality of service (QoS) null frame or a data frame. When the second indication information is transmitted through a QoS null frame, the QoS null frame may include an ACK policy. Accordingly, the first STA may transmit an ACK of the second indication information based on the ACK policy.

The first indication information may be included in a data field of the PPDU transmitted to the second. STA. The indication information may be included in a medium access control (MAC) header of the data field.

Figure 33:
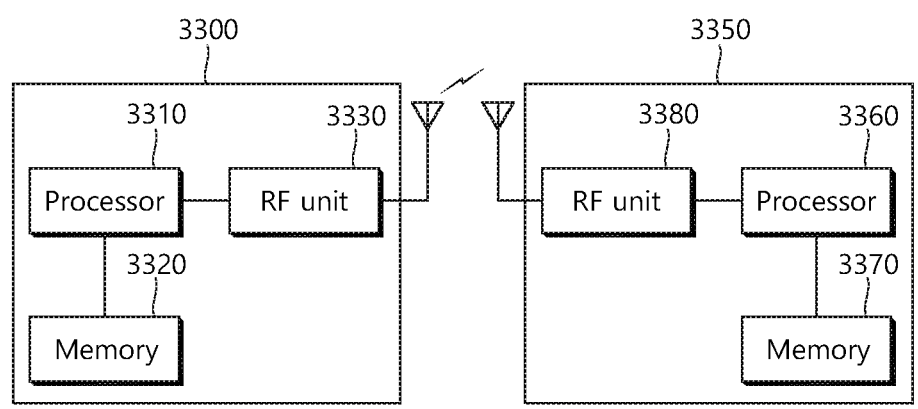
FIG. 33 is a block view illustrating a wireless device to which the exemplary embodiment of the present invention can be applied.

FIG. 33 is a block view illustrating a wireless device to which the exemplary embodiment of the present invention can be applied.

Referring to FIG. 33, as an STA that can implement the above-described exemplary embodiment, the wireless device may correspond to an AP or a non-AP STA. The wireless device may correspond to the above-described user or may correspond to a transmitting device transmitting a signal to the user.

The AP 3300 includes a processor 3310, a memory 3320, and a radio frequency (RF) unit 3330.

The RF unit 3330 is connected to the processor 3310, thereby being capable of transmitting and/or receiving radio signals.

The processor 3310 implements the functions, processes, and/or methods proposed in the present invention. For example, the processor 3310 may be implemented to perform the operations according to the above-described exemplary embodiments of the present invention. More specifically, among the operations that are disclosed in the exemplary embodiments of FIG. 1 to FIG. 32, the processor 3310 may perform the operations that may be performed by the AP.

The non-AP STA 3350 includes a processor 3360, a memory 3370, and a radio frequency (RF) unit 3380.

The RF unit 3380 is connected to the processor 3360, thereby being capable of transmitting and/or receiving radio signals.

The processor 3360 implements the functions, processes, and/or methods proposed in the present invention. For example, the processor 3360 may be implemented to perform the operations of the non-AP STA according to the above-described exemplary embodiments of the present invention. The processor may perform the operations of the non-AP STA, which are disclosed in the exemplary embodiments of FIG. 1 to FIG. 32.

The processor 3310 and 3360 may include an application-specific integrated circuit (ASIC), another chip set, a logical circuit, a data processing device, and/or a converter converting a baseband signal and a radio signal to and from one another. The memory 3320 and 3370 may include a read-only memory (ROM), a random access memory (RAM), a flash memory, a memory card, a storage medium, and/or another storage device. The RF unit 3330 and 3380 may include one or more antennas transmitting and/or receiving radio signals.

When the exemplary embodiment is implemented as software, the above-described method may be implemented as a module (process, function, and so on) performing the above-described functions. The module may be stored in the memory 3320 and 3370 and may be executed by the processor 3310 and 3360. The memory 3320 and 3370 may be located inside or outside of the processor 3310 and 3360 and may be connected to the processor 3310 and 3360 through a diversity of well-known means.

What is claimed is:

1. A method in a wireless local area network (WLAN) system, the method comprising:
 transmitting, by a first station (STA), first indication information on an operating mode to a second STA, wherein the operating mode is related to a number of spatial streams and a channel bandwidth which are supported by the first STA; and
 applying, by the first STA, the first indication information upon receiving an acknowledgement (ACK) of the first indication information,
 wherein the first indication information comprises an operating mode field including information on a change of the operating mode in a receive operating mode (ROM) or a transmit operating mode (TOM), and
 wherein the first indication information is transmitted through a quality of service (QoS) null frame or a data frame; and
 receiving, by the first STA, a physical layer protocol data unit (PPDU) in an operating mode changed based on the first indication information when the operating mode is in the ROM,
 wherein when the first STA does not receive the ACK of the first indication information, the PPDU is transmitted comprising an ROM request/response bit, and
 wherein the ROM request/response bit includes information on that the second STA transmits the PPDU in an operating mode changed based on the first indication information.

2. The method of claim 1, wherein the ROM request/response bit is further comprised in the first indication information.

3. The method of claim 1, further comprising:
 receiving, by the first STA, second indication information on a change of an operating mode including information on a number of spatial streams and a channel bandwidth which are supported by the first STA from the second STA when the first STA does not receive the ACK of the first indication information,
 wherein the number of spatial streams and the channel bandwidth indicated by the second indication information are the same as the number of spatial streams and the channel bandwidth indicated by the first indication information.

4. The method of claim 3, wherein the second indication information is transmitted through the QoS null frame or the data frame.

5. The method of claim 4, wherein when the second indication information is transmitted through the QoS null frame, the QoS null frame comprises an ACK policy.

6. The method of claim 5, further comprising:
 transmitting, by the first STA, an ACK of the second indication information based on the ACK policy.

7. The method of claim 1, further comprising:
 transmitting, by the first STA, a PPDU in an operating mode changed based on the first indication information when the operating mode is in the TOM.

8. The method of claim 1, wherein the channel bandwidth comprises at least one of 20 MHz, 40 MHz, 80 MHz, and 160 MHz.

9. The method of claim 1, wherein the first STA is a non-access point (AP) STA, and the second STA is an AP STA that communicates with the non-AP STA.

10. A first station (STA) in a wireless local area network (WLAN) system, the first STA comprising:
 a radio frequency (RF) unit to transmit or receive a radio signal; and
 a processor to control the RF unit,
 wherein the processor:
 transmits first indication information on an operating mode to a second STA, wherein the operating mode is related to a number of spatial streams and a channel bandwidth which are supported by the first STA; and
 applies the first indication information upon receiving an acknowledgement (ACK) of the first indication information,
 wherein the first indication information comprises an operating mode field including information on a change of the operating mode in a receive operating mode (ROM) or a transmit operating mode (TOM), and
 wherein the first indication information is transmitted through a quality of service (QoS) null frame or a data frame; and
 receives a physical layer protocol data unit (PPDU) in an operating mode changed based on the first indication information when the operating mode is in the ROM,
 wherein the PPDU comprises an ROM request/response bit, and
 wherein the ROM request/response bit includes information on that the second STA transmits the PPDU in an operating mode changed based on the first indication information.

* * * * *